(12) United States Patent
Sabry et al.

(10) Patent No.: US 11,953,377 B2
(45) Date of Patent: Apr. 9, 2024

(54) INTEGRATED EVANESCENT WAVE SPECTRAL SENSING DEVICE

(71) Applicant: Si-Ware Systems, Cairo (EG)

(72) Inventors: Yasser M. Sabry, Cairo (EG); Amr O. Ghoname, Cairo (EG); Momen Anwar, Cairo (EG); Diaa Khalil, Cairo (EG)

(73) Assignee: SI-WARE SYSTEMS, Cairo (EG)

(*) Notice: Subject to any disclaimer, the term of this patent is extended or adjusted under 35 U.S.C. 154(b) by 0 days.

(21) Appl. No.: 17/671,983

(22) Filed: Feb. 15, 2022

(65) Prior Publication Data
US 2022/0260419 A1 Aug. 18, 2022

Related U.S. Application Data

(60) Provisional application No. 63/150,016, filed on Feb. 16, 2021.

(51) Int. Cl.
*G01J 3/45* (2006.01)
*G01J 3/02* (2006.01)
(Continued)

(52) U.S. Cl.
CPC ............... *G01J 3/45* (2013.01); *G01J 3/021* (2013.01); *G01J 3/26* (2013.01); *G01N 21/35* (2013.01);
(Continued)

(58) Field of Classification Search
CPC .... G01J 3/45; G01J 3/021; G01J 3/26; G01N 21/35; G01N 21/552; G01N 2021/3595;
(Continued)

(56) References Cited

U.S. PATENT DOCUMENTS

| 7,233,396 B1 * | 6/2007 | Hall | G01N 21/45 356/369 |
| 7,488,940 B2 * | 2/2009 | Ohtake | G01N 21/552 250/341.3 |

(Continued)

FOREIGN PATENT DOCUMENTS

| DE | 10030920 C2 * | 1/2003 | ............. G01N 21/03 |
| JP | 2012127823 A * | 7/2012 | ............. G01N 21/35 |

(Continued)

OTHER PUBLICATIONS

Averett, Lacey A., et al., "Effective Path Length in Attenuated Total Reflection Spectroscopy", Analytical Chemistry, vol. 80, No. 8, Apr. 15, 2008, pp. 3045-3049.

(Continued)

*Primary Examiner* — Michelle M Iacoletti
*Assistant Examiner* — Noah J. Haney
(74) *Attorney, Agent, or Firm* — Loza & Loza, LLP; Holly L. Rudnick

(57) ABSTRACT

Aspects relate to an integrated and compact attenuated total internal reflection (ATR) spectral sensing device. The spectral sensing device includes a substrate, a spectrometer, and a detector. The substrate includes an ATR element, a microfluidic channel, and a channel interface at a boundary between the ATR element and the microfluidic channel formed therein. The ATR element is configured to receive input light and to direct the input light to the channel interface for total internal reflection of the input light at the channel interface. An evanescent wave produced by a sample contained within the microfluidic channel based on the total internal reflection of the input light attenuates the light output from the ATR element and the resulting output light may be analyzed using the spectrometer and the detector.

25 Claims, 18 Drawing Sheets

(51) Int. Cl.
  *G01J 3/26* (2006.01)
  *G01N 21/35* (2014.01)
  *G01N 21/552* (2014.01)
  *G02B 6/26* (2006.01)
  *G02B 26/08* (2006.01)
  *G02F 1/29* (2006.01)

(52) U.S. Cl.
  CPC ............ *G01N 21/552* (2013.01); *G02B 6/26* (2013.01); *G02B 26/0833* (2013.01); *G02F 1/29* (2013.01); *G01N 2021/3595* (2013.01); *G02F 2201/124* (2013.01)

(58) Field of Classification Search
  CPC ......... G02B 6/26; G02B 26/0833; G02F 1/29; G02F 2201/124
  USPC ........................................................ 356/326
  See application file for complete search history.

(56) References Cited

U.S. PATENT DOCUMENTS

| | | | |
|---|---|---|---|
| 10,060,791 B2 | 8/2018 | Sabry et al. | |
| 2002/0125589 A1* | 9/2002 | Katzir | G01N 21/552 423/491 |
| 2006/0043301 A1* | 3/2006 | Mantele | G01N 21/552 250/339.11 |
| 2006/0065529 A1* | 3/2006 | Schlenoff | G01N 27/44752 204/600 |
| 2012/0250017 A1* | 10/2012 | Morys | G01J 3/021 356/450 |
| 2016/0045143 A1* | 2/2016 | Lee | A61B 5/1455 600/309 |
| 2017/0363469 A1* | 12/2017 | Sabry | G01J 3/0229 |
| 2019/0369015 A1* | 12/2019 | Ismail | G01N 33/48735 |
| 2020/0217788 A1* | 7/2020 | Poteet | G01J 3/42 |

FOREIGN PATENT DOCUMENTS

| | | | | |
|---|---|---|---|---|
| WO | | 2011120169 A1 | 10/2011 | |
| WO | WO-2021085341 A1 * | | 5/2021 | ........... A61B 5/0075 |

OTHER PUBLICATIONS

Cheng, Wei, et al., Rapid microparticle patterning by enhanced dielectrophoresis effect on a double-layer electrode substrate, Electrophoresis, vol. 32, (2011), pp. 3371-3377.
Fahrenfort, J., "Attenuated total reflection* A new principle for the production of useful infra-red reflection spectra of organic compounds", Spectrochimica Acta, vol. 17, (1961), pp. 698-700.
Griffiths, Peter, R., "Fourier Transform Infrared Spectrometry, Second Edition", Wiley-Interscience, (2007) 557 pages.
Karabudak, Engin, "Micromachined silicon attenuated total reflectance infrared spectroscopy: An emerging detection method in micro/nanofluidics", Electrophoresis, vol. 35, (2014), pp. 236-244.
Kazarian, Sergi, G., et al., Micro- and macro-attenuated total reflection Fourier transform infrared spectroscopic imaging. Plenary Lecture at the 5th International Conference on Advanced Vibrational Spectroscopy, 2009, Melbourne, Australia. Applied spectroscopy, vol. 64, No. 5 (2010), pp. 135A-152A.
Lenshof, Andreas, et al., "Continuous separation of cells and particles in microfluidic systems", Chem. Soc. Rev., vol. 39, (2010), pp. 1203-1217.
Milosevic, Milan, "Internal Reflection and ATR Spectroscopy", Wiley, (2012), 258 pages.
Mortada, Bassem, et al., "High-throughput deeply-etched scanning Michelson interferometer on-chip", 2014 International Conference on Optical MEMS and Nanophotonics, (2014), pp. 161-162.
Perro, Adeline, et al., "Combining microfluidics and FT-IR spectroscopy: towards spatially resolved information on chemical processes", React. Chem. Eng., vol. 1, (2016), pp. 577-594.
Pething, Ronald, "Dielectrophoresis, Theory, Methodology and Biological Applications, First Edition", Wiley, (2017), 437 pages.
Saadany, B., et al., "MEMS Tunable Michelson Interferometer with Robust Beam Splitting Architecture", 2009 IEEE/LEOS International Conference on Optical MEMS and Nanophotonics, (2009), pp. 49-50.
Sabry, Yasser, M., et al., "Monolithic silicon-micromachined free-space optical interferometers onchip", Laser Photonics Rev., vol. 9, No. 1, (2015), pp. 1-24.
Sabry, Yasser, M., et al., "Ultra-compact MEMS FTIR spectrometer", Proc. SPIE 10210, Next-Generation Spectroscopic Technologies X, 102100H, May 5, 2017, 8 pages.
Sajeesh, P., et al., "Particle separation and sorting in microfluidic devices: a review", Microfluid Nanofluid, vol. 17, (2014), pp. 1-52.
Schumacher, Henrik, et al., "Applications of Microstructured Silicon Wafers as Internal Reflection Elements in Attenuated Total Reflection Fourier Transform Infrared Spectroscopy", Applied Spectroscopy, vol. 64, No. 9, (2010), pp. 1022-1027.
Engin Karabudak: "Micromachined silicon attenuated total reflectance infrared spectroscopy: An emerging detection method in micro/nanofluidics", Electrophoresis, Verlag Chemie, Hoboken, USA, vol. 35, Dec. 2, 2013 (Dec. 2, 2013), pp. 236-244, XP071502277, ISSN: 0173-0835, DOI: 10.1002/ELPS.201300248, p. 238, left-hand column, last paragraph, p. 240, right-hand column, last line; figures 3-5, p. 236, right-hand column, paragraph 3.
Ghoname Amr O et al: "Attenuated total reflection (ATR) MEMS FTIR spectrometer", SPIE Proceedings; [Proceedings of SPIE ISSN 0277-786X], SPIE, US, vol. 11293, Feb. 28, 2020 (Feb. 28, 2020), pp. 112930W-112930W, XP060130414, DOI: 10.1117/12.2546012, ISBN: 978-1-5106-3673-6, abstract; figures 1-3.
International Search Report and Written Opinion—PCT/US2022/016532—ISA/EPO—dated May 6, 2022.

* cited by examiner

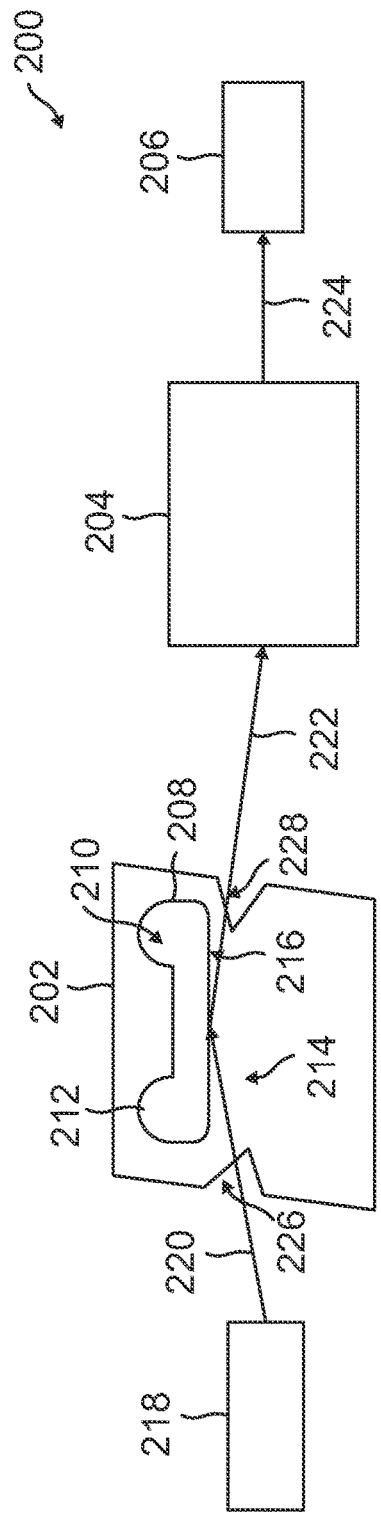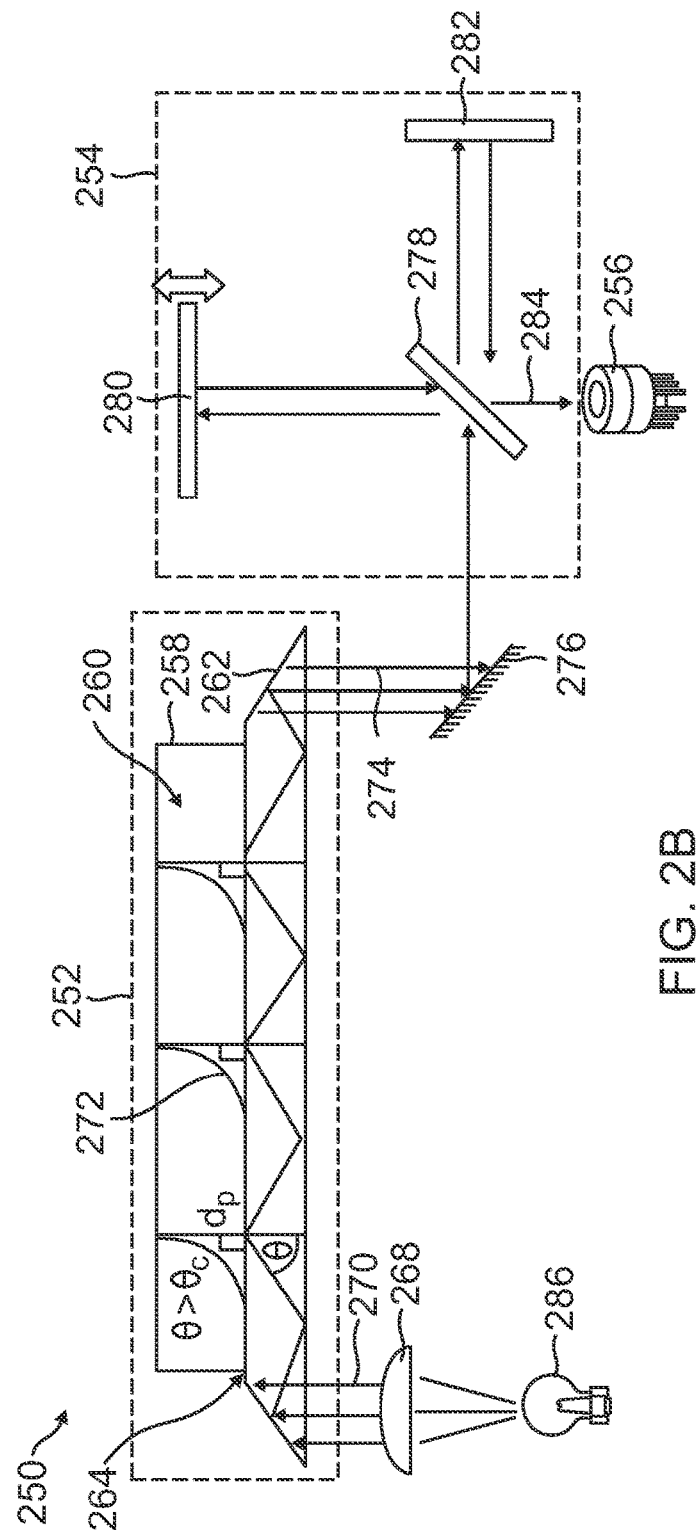
FIG. 2A
FIG. 2B

INTEGRATED EVANESCENT WAVE SPECTRAL SENSING DEVICE

PRIORITY CLAIM

This application claims priority to and the benefit of Provisional Application No. 63/150,016, filed in the U.S. Patent and Trademark Office on Feb. 16, 2021, the entire content of which is incorporated herein by reference as if fully set forth below in its entirety and for all applicable purposes.

TECHNICAL FIELD

The technology discussed below relates generally to attenuated total internal reflection (ATR), and in particular to mechanisms to integrate an ATR element within a spectral sensing device.

BACKGROUND

Infrared spectroscopy provides characterization of the vibrational and rotational energy levels of molecules in different materials. When the material is exposed to infrared light, absorption of photons occurs at certain wavelengths due to transitions between vibrational levels. In general, there are two mechanisms for performing spectral measurements: transmission mode in which the infrared light passes through a sample under test or reflection mode in which the infrared light is reflected from the sample under test.

Attenuated total internal reflection (ATR) spectroscopy is a type of reflection coupling which depends on internal reflection of light inside a high refractive index material while placing a sample in intimate contact with the material. ATR spectroscopy enables spectral analysis of all types of samples with minimal sample preparation. ATR has been used as an effective way to analyze fluid and solid samples based on the phenomenon of total internal reflection of light at the boundary between two media. Typically, a high refractive index material such as zinc selenide, germanium, or silicon, referred to as an ATR crystal, ATR internal reflection element (IRE), or ATR element, is illuminated with an IR source, while the sample covers the ATR crystal and is in intimate contact therewith. If the angle of input light is higher than a critical angle at the boundary between the ATR crystal and the sample, light is totally internally reflected and a special type of electromagnetic wave, called an evanescent wave, is formed on the sample side. The sample absorbs some of the intensity of the evanescent wave due to molecular vibrations at certain wavelengths. Hence, the intensity of reflected light is attenuated relative to the incoming intensity. The output light of the crystal may then be coupled to a Fourier Transform Infrared (FTIR) system, as an example for spectroscopic techniques, which may be based on a Michelson interferometer, and then to a broad-band IR detector to analyze the sample spectrum.

ATR techniques are divided according to the size of the IRE into macro-ATR and micro-ATR techniques. In macro-ATR, commercial ATR crystals of different large sizes are used according to the required field of view and spatial resolution. In addition, the macro-ATR technique has been implemented as an analytical tool for liquids in microfluidic chips where liquid flows inside micron-size channels. An example of a macro-ATR technique includes a microfluidic device built on top of a commercial polished ATR IRE using a polydimethylsiloxane (PDMS) device.

To avoid the large cost of the IREs and the need for mechanical polishing, micromachined elements fabricated on silicon wafers have started to take the place of the bulky crystals, which is referred to as micro-ATR. Anisotropic KOH-etching of silicon wafers is used to provide an inclined optical surface for light interaction. Then, glass wafers with micromachined channels are bonded on the top of the wafer or the fluid patterns are fabricated on this non-grooved surface. This enables combining ATR spectroscopy and microfluidics, which has various applications in biology and chemistry disciplines. However, additional complexity is added to the sample preparation and measurement steps as there are three separate systems that need to be aligned together: the microfluidic chip, the micro-ATR IREs, and the spectrometer optical coupling system.

SUMMARY

The following presents a summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

In an example, an integrated spectral sensing device is disclosed. The integrated spectral sensing device includes a first substrate including an attenuated total internal reflection (ATR) element, a microfluidic channel, and a channel interface corresponding to a boundary between the ATR element and the microfluidic channel formed therein. The ATR element is configured to receive input light and to produce output light based on total internal reflection of the input light at the channel interface. The output light is attenuated by an evanescent wave produced by a sample contained within the microfluidic channel based on the total internal reflection of the input light. The integrated spectral sensing device further includes a spectrometer configured to produce an interference beam either corresponding to the input light or based on the output light and a detector configured to detect a spectrum of the interference beam or the output light.

These and other aspects of the invention will become more fully understood upon a review of the detailed description, which follows. Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

BRIEF DESCRIPTION OF THE DRAWINGS

FIG. 2A is a diagram illustrating an example of an integrated spectral sensing device.

FIG. 2B is a top view of another example of an integrated spectral sensing device according to some aspects.

DETAILED DESCRIPTION

Figure 1:
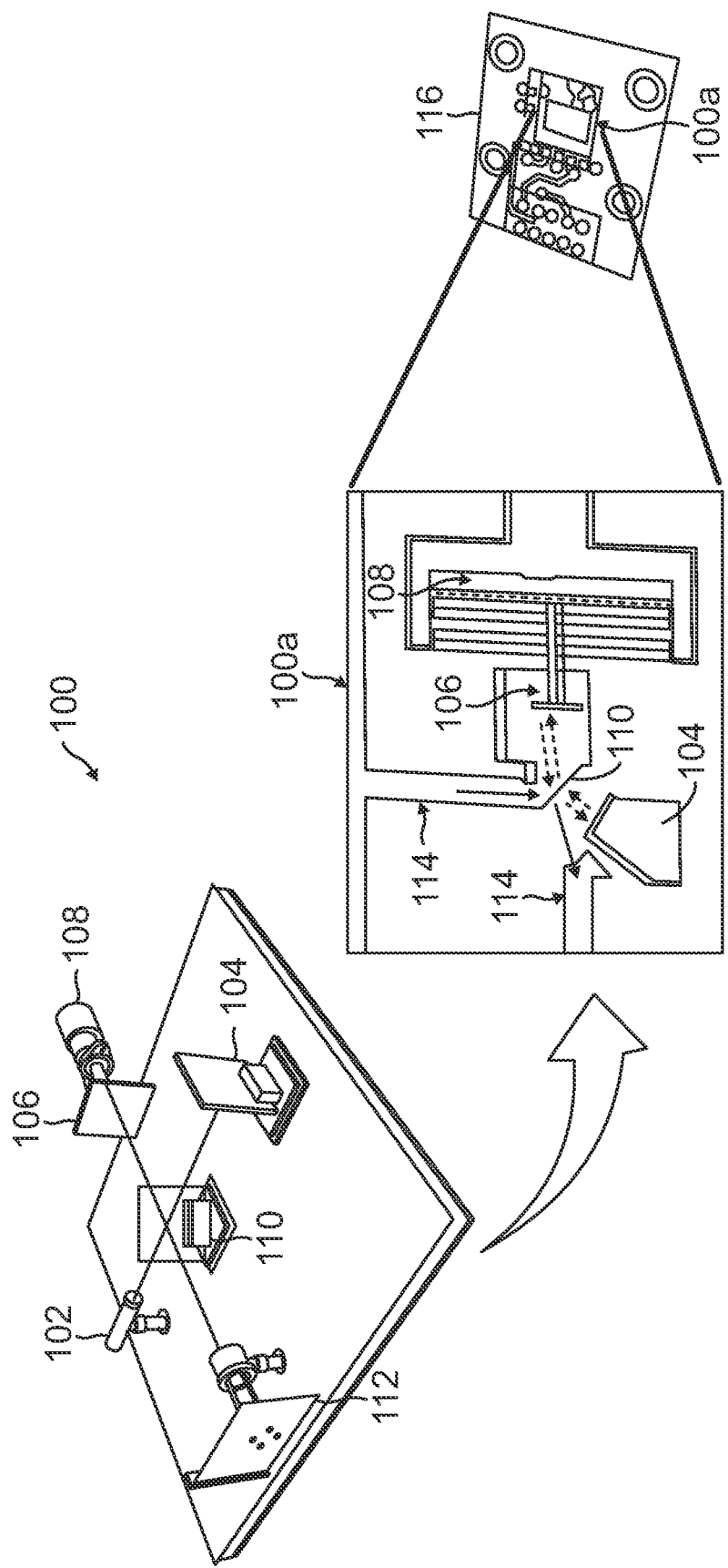
FIG. 1 is a diagram illustrating a spectrometer according to some aspects.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Various aspects of the disclosure relate to an integrated and compact ATR spectral sensing device. The spectral sensing device includes a substrate, a spectrometer, and a detector. The substrate includes an ATR element, a microfluidic channel, and a channel interface at a boundary between the ATR element and the microfluidic channel formed therein. The ATR element is configured to receive input light and to direct the input light to the channel interface for total internal reflection of the input light at the channel interface. An evanescent wave can then be produced by a sample contained within the microfluidic channel based on the total internal reflection of the input light. The evanescent wave attenuates the light output from the ATR element and the resulting output light may be analyzed using the spectrometer and the detector.

The spectrometer core can be based on an FTIR spectroscopic technique, tunable filter, diffraction grating or other suitable spectroscopic technique for selectively measuring different wavelengths of the light spectrum. In some examples, an ATR IRE (also referred to herein as an ATR crystal or ATR element) can be integrated with an FTIR-based spectrometer, which may include, for example, a micro-electro-mechanical systems (MEMS) Michelson interferometer and reflecting micro-optical elements (light redirecting elements) for light coupling to and from the spectrometer core.

In the integrated spectral sensing device, light propagates inside the ATR element in-plane with respect to the spectrometer, either in a separate substrate or in the same substrate of the spectrometer. In such an in-plane configuration, the ATR IRE element may be micromachined, using for example, deep reactive ion etching (DRIE), such that light travels parallel to the substrate, allowing a high level of monolithic integration of all ATR and spectrometer elements in a single compact module. In addition, in-plane ATR allows forming IREs with the desired shape and dimensions depending on the measured sample. For example, the incidence angle and number of reflections may be adapted in the design.

In some examples, the integrated spectral sensing device includes three substrates, one for the spectrometer (e.g., MEMS interferometer), another for the light redirecting element(s) and a third for an ATR crystal (ATR element), where the three substrates are coupled together in a single module. In other examples, the ATR element and spectrometer (e.g., MEMS interferometer) are formed in the same substrate (e.g., a silicon substrate) and coupled to another substrate containing the light redirecting element(s). The substrate containing the monolithically integrated ATR element/MEMS interferometer can further include guiding structures in the silicon to guide light to/from the microfluidic channels in which liquid flows.

Unlike conventional ATR element designs, in various aspects of the disclosure, the sample fluid flows between input and output ports adjacent to the ATR IRE on the same substrate avoiding difficult bonding and alignment steps of two separate wafers together. Both designs presented herein can easily be used to measure the ATR signal and analyze materials in the mid-infrared (MIR) range making use of silicon transmission properties in the IR range and free space coupling to MEMS chip. In addition, the integration of microfluidic channels with a micro-spectrometer in a single module results in a cheap and simple device to analyze samples in an ATR sampling mode. Different particle separation and sorting techniques may further be added to the microfluidic devices to analyze micro particles and contaminants using the integrated spectral sensing device.

FIG. 1 is a diagram illustrating a spectrometer 100 according to some aspects. The spectrometer 100 may be, for example, a Fourier Transform infrared (FTIR) spectrometer. In the example shown in FIG. 1, the spectrometer 100 is a Michelson FTIR interferometer. In other examples, the spectrometer may include an FTIR Fabry-Perot interferometer.

FTIR spectrometers measure a single-beam spectrum (power spectral density (PSD)), where the intensity of the single-beam spectrum is proportional to the power of the radiation reaching the detector. In order to measure the absorbance of a sample, the background spectrum (i.e., the single-beam spectrum in absence of a sample) may first be measured to compensate for the instrument transfer function. The single-beam spectrum of light transmitted or reflected from the sample may then be measured. The absorbance of the sample may be calculated from the transmittance, reflectance, or trans-reflectance of the sample. For example, the absorbance of the sample may be calculated as the ratio of the spectrum of transmitted light, reflected light, or trans-reflected light from the sample to the background spectrum.

The interferometer 100 includes a fixed mirror 104, a moveable mirror 106, a beam splitter 110, and a detector 112 (e.g., a photodetector). A light source 102 associated with the spectrometer 100 is configured to emit an input beam and to direct the input beam towards the beam splitter 110. The light source 102 may include, for example, a laser source, one or more wideband thermal radiation sources, or a quantum source with an array of light emitting devices that cover the wavelength range of interest.

The beam splitter 110 is configured to split the input beam into two beams. One beam is reflected off of the fixed mirror 104 back towards the beam splitter 110, while the other beam is reflected off of the moveable mirror 106 back towards the beam splitter 110. The moveable mirror 106 may be coupled to an actuator 108 to displace the movable mirror 106 to the desired position for reflection of the beam. An optical path length difference (OPD) is then created between the reflected beams that is substantially equal to twice the mirror 106 displacement. In some examples, the actuator 108 may include a micro-electro-mechanical systems (MEMS) actuator, a thermal actuator, or other type of actuator.

The reflected beams interfere at the beam splitter 110 to produce an interference beam (e.g., an interference pattern), allowing the temporal coherence of the light to be measured at each different Optical Path Difference (OPD) offered by the moveable mirror 106. In some examples, the signal corresponding to the interference beam may be directed to a sample (not shown) and the output light (scattered light) from the sample may be detected and measured by the detector 112 at many discrete positions of the moveable mirror 106 to produce an interferogram. In other examples, the input beam may be directed to the sample prior to input to the interferometer 100. In some examples, the detector 112 may include a detector array or a single pixel detector. The interferogram data versus the OPD may then be input to a processor (not shown, for simplicity). The spectrum may then be retrieved, for example, using a Fourier transform carried out by the processor.

In some examples, the interferometer 100 may be implemented as a MEMS interferometer 100a (e.g., a MEMS chip). The MEMS chip 100a may then be attached to a printed circuit board (PCB) 116 that may include, for example, one or more processors, memory devices, buses, and/or other components. As used herein, the term MEMS refers to the integration of mechanical elements, sensors, actuators and electronics on a common silicon substrate through microfabrication technology. For example, the microelectronics are typically fabricated using an integrated circuit (IC) process, while the micromechanical components are fabricated using compatible micromachining processes that selectively etch away parts of the silicon wafer or add new structural layers to form the mechanical and electro-mechanical components. One example of a MEMS element is a micro-optical component having a dielectric or metallized surface working in a reflection or refraction mode. Other examples of MEMS elements include actuators, detector grooves and fiber grooves.

In the example shown in FIG. 1, the MEMS interferometer 100a may include the fixed mirror 104, moveable mirror 106, beam splitter 110, and MEMS actuator 108 for moveably controlling the moveable mirror 106. In addition, the MEMS interferometer 100a may include fibers 114 for directing the input beam towards the beam splitter 110 and the output beam from the beam splitter 110 towards the detector (e.g., detector 112). In some examples, the MEMS interferometer 100a may be fabricated using a Deep Reactive Ion Etching (DRIE) process on a Silicon On Insulator (SOI) wafer in order to produce the micro-optical components and other MEMS elements that are able to process free-space optical beams propagating parallel to the SOI substrate. For example, the electro-mechanical designs may be printed on masks and the masks may be used to pattern the design over the silicon or SOI wafer by photolithography. The patterns may then be etched (e.g., by DRIE) using batch processes, and the resulting chips (e.g., MEMS chip 100a) may be diced and packaged (e.g., attached to the PCB 116).

For example, the beam splitter 110 may be a silicon/air interface beam splitter (e.g., a half-plane beam splitter) positioned at an angle (e.g., 45 degrees) from the input beam. The input beam may then be split into two beams L1 and L2, where L1 propagates in air towards the moveable mirror 106 and L2 propagates in silicon towards the fixed mirror 104. Here, L1 originates from the partial reflection of the input beam from the half-plane beam splitter 110, and thus has a reflection angle equal to the beam incidence angle. L2 originates from the partial transmission of the input beam through the half-plane beam splitter 110 and propagates in silicon at an angle determined by Snell's Law. In some examples, the fixed and moveable mirrors 104 and 106 are metallic mirrors, where selective metallization (e.g., using a shadow mask during a metallization step) is used to protect the beam splitter 110. In other examples, the mirrors 104 and 106 are vertical Bragg mirrors that can be realized using, for example, DRIE.

In some examples, the MEMS actuator 108 may be an electrostatic actuator formed of a comb drive and spring. For example, by applying a voltage to the comb drive, a potential difference results across the actuator 108, which induces a capacitance therein, causing a driving force to be generated as well as a restoring force from the spring, thereby causing a displacement of moveable mirror 106 to the desired position for reflection of the beam back towards the beam splitter 110.

In various aspects of the disclosure, the spectrometer 100 shown in FIG. 1 or other suitable spectral sensing unit may be incorporated into an integrated evanescent wave spectral sensing device. FIG. 2A is a diagram illustrating an example of an integrated spectral sensing device 200 according to some aspects. The integrated spectral sensing device 200 includes a substrate 202, such as a silicon substrate or a SOI substrate, a spectrometer 204 (e.g., a MEMS interferometer, as shown in FIG. 1), and a detector 206. The substrate 202 includes an ATR element 214 and a microfluidic channel 208 formed in the substrate 202 using, for example, a DRIE process. The ATR element 214 may correspond to or include a waveguide for passing light therethrough. The microfluidic channel 208 includes a sample 210 (e.g., a fluid) that flows through the microfluidic channel 208 between input and output microfluidic ports 212. The sample 210 flows adjacent to a boundary 216 between the microfluidic channel 208 and the ATR element 214. The boundary 216 corresponds to a channel interface between the ATR element 214 and the microfluidic channel 208 and may be formed by a surface of the ATR element 214 against which the sample 210 is in contact. For example, the boundary or channel interface 216 may correspond to an inclined or vertical surface of the ATR element 214 that further serves as an internal surface of the microfluidic channel 208. In examples in which the substrate 202 is a silicon or SOI substrate, the channel interface 216 may correspond to a silicon-air (Si-air) interface forming a silicon-sample (Si-sample) interface with the sample inserted.

A light source 218 (e.g., an external IR blackbody source) is configured to generate input light 220 (e.g., IR light or NIR light). The input light 220 is directed into the ATR element 214 in the substrate 202. The ATR element 214 may be a single-reflection ATR element, as shown in FIG. 2A, or a multiple-reflections ATR element. The ATR element 214 is designed to produce total internal reflection of the input light 220 at the channel interface 216. For example, the ATR element 214 may have a size (dimensions, thickness, etc.) and shape (e.g., V-shaped input and output interfaces 226 and 228) configured to produce an angle of the input light 220 that is higher than a critical angle at the boundary 216 between the ATR element 214 and the sample 210. The resulting evanescent wave produced in the sample 210 based on the total internal reflection of the input light 220 attenuates the input light 220 to produce output light 222 that may be input to the spectrometer 204. In some examples, the integrated spectral sensing device may further include one or more optical elements, such as optical focusing elements (e.g., lens) and/or light redirecting elements (e.g., mirrors or other reflectors) to direct the light into the ATR element 214 and/or from the ATR element 214 to the spectrometer 204. The spectrometer 204 is configured to produce an interference beam (interference pattern) 224 of the output light 222 and to provide the interference beam 224 to the detector 206 for spectral analysis.

In some examples, the spectrometer 204 may be positioned before the ATR element 214. In this example, the spectrometer 204 may be configured to receive the input light 220 from the light source 218, to produce the interference beam 224 from the input light 220, and to direct the interference beam 224 to the ATR element 214. The output light 222 from the ATR element 214 may then be directed to the detector 206.

FIG. 2B is a top view of another example of an integrated spectral sensing device 250 according to some aspects. The integrated spectral sensing device 250 includes a substrate 252, a spectrometer 254 (e.g., a MEMS interferometer, as shown in FIG. 1), and a detector 256. The substrate 252 includes an ATR element 262 and a microfluidic channel 258 formed in the substrate 252. The ATR element 262 may correspond to or include a waveguide. The microfluidic channel 258 includes a sample 260 (e.g., a fluid) that flows through the microfluidic channel 258 adjacent to a boundary 264 (e.g., a channel interface) between the microfluidic channel 258 and the ATR element 262.

A light source 286 (e.g., an external IR blackbody source) is configured to generate input light 270 (e.g., IR light or NIR light) and direct the input light 270 to an optical component (e.g., a lens) 268 that couples the input light 270 into the ATR element 262. In the example shown in FIG. 2B, the ATR element 262 is a multiple-reflections ATR element.

The ATR element 262 is designed to produce total internal reflection of the input light 270 at the channel interface 264. For example, the ATR element 264 may be designed to produce an angle $\theta$ of the input light 270 that is higher than a critical angle $\theta_c$ at the channel interface 264 between the ATR element 262 and the sample 260. The total internal reflection of the input light 270 forms an evanescent wave 272 on the sample side of the boundary 262. The sample 260 absorbs some of the intensity of the evanescent wave 272 due to molecular vibrations at certain wavelengths. Hence, the intensity of the reflected light (total internally reflected light) is attenuated relative to the incoming intensity. The output light 274 attenuated with respect to the input light 270 based on the total internal reflection of the input light 270 and the evanescent wave produced by the sample 260 is coupled into the spectrometer 254 via a light redirecting element (e.g., a mirror) 276.

The spectrometer 254 shown in FIG. 2B is a MEMS interferometer that includes a beam splitter 278, a moveable mirror 280, and a fixed mirror 282. The beam splitter 278 is configured to split the output light 274 into two beams. One beam is reflected off of the fixed mirror 282 back towards the beam splitter 278, while the other beam is reflected off of the moveable mirror 280 back towards the beam splitter 278. The moveable mirror 280 may be coupled to an actuator (not shown) to displace the movable mirror 280 to the desired position for reflection of the beam. An optical path length difference (OPD) is then created between the reflected beams that is substantially equal to twice the mirror 280 displacement. The reflected beams interfere at the beam splitter 278 to produce an interference beam (e.g., an interference pattern) 284, allowing the temporal coherence of the output light 274 to be measured at each different Optical Path Difference (OPD) offered by the moveable mirror 280. The interference beam (interference pattern) 284 may be detected and measured by the detector 256 at many discrete positions of the moveable mirror 280 to produce an interferogram that represents a spectrum of the sample 260.

Figure 3:
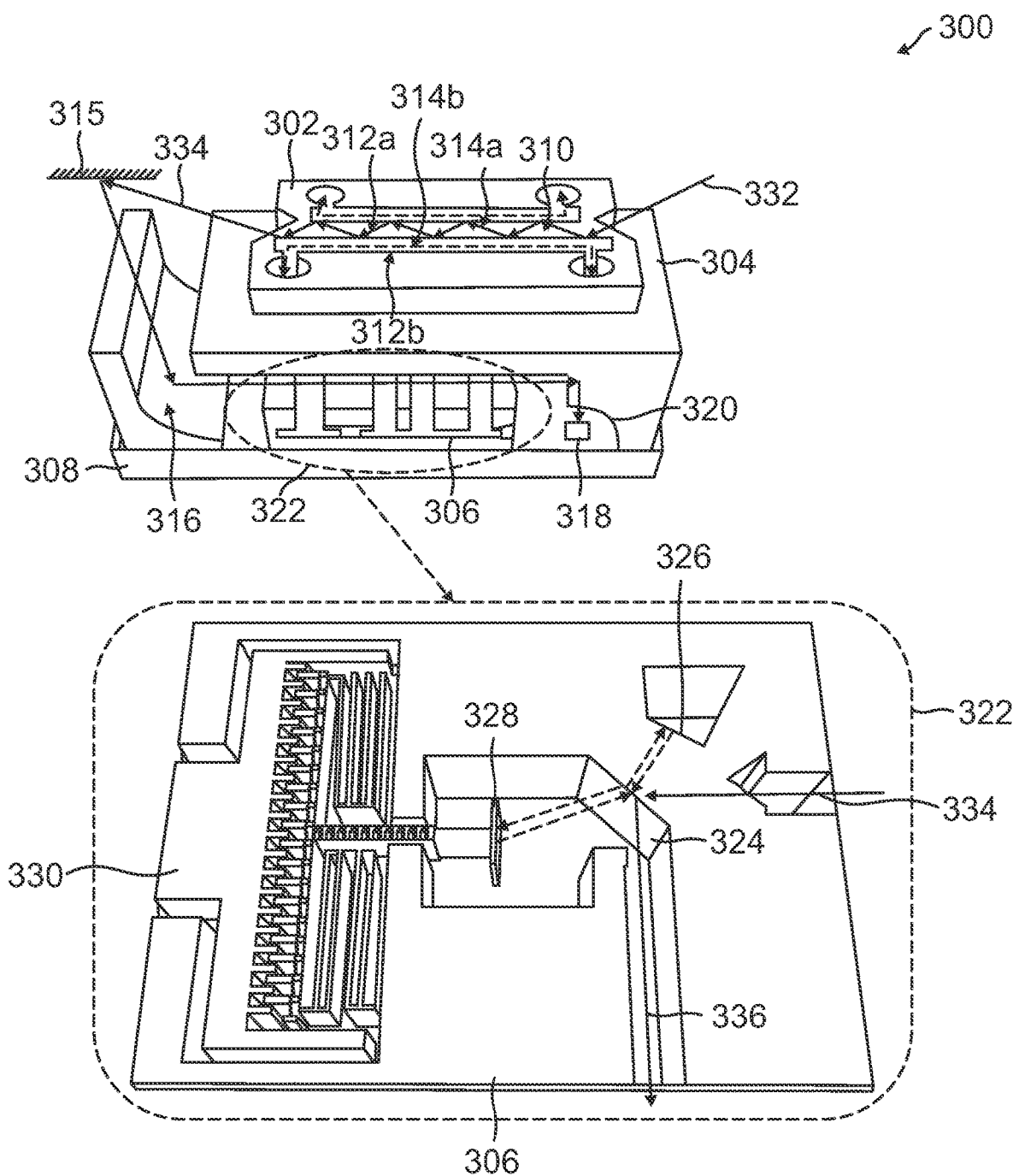
FIG. 3 is a diagram illustrating an example of a multi-substrate integrated spectral sensing device according to some aspects.

FIG. 3 is a diagram illustrating an example of a multi-substrate integrated spectral sensing device 300 according to some aspects. In the example shown in FIG. 3, the integrated spectral sensing device 300 includes three substrates 302, 304, and 306. A first substrate 302 is positioned in a first plane that is parallel to a second plane of a third substrate 306. The integrated spectral sensing device 300 may further include a package substrate 308. The third substrate 306 may be positioned on (e.g., bonded to) the package substrate 308. In addition, a second substrate 304 may be positioned over the third substrate 306 and bonded to the package substrate 308 at respective ends of the second substrate 304. A detector 318 may further be positioned on the package substrate 308. Each of the substrates 302, 306, and 308 may be, for example, a silicon or SOI substrate. In some examples, the second substrate 304 may be a plastic or glass substrate formed using injection molded optics technology.

The first substrate 302 includes an ATR element 310 and two opposing microfluidic channels 312a and 312b. The ATR element 310 and microfluidic channels 312a and 312b are formed within the first substrate 302 via, for example, a DRIE process. The ATR element 310 may correspond to or include a waveguide. Each microfluidic channel 312a and 312b includes a sample (e.g., a fluid) that flows through the microfluidic channels 312a and 312b adjacent to a respective boundary 314a and 314b (e.g., a channel interface) between the respective microfluidic channel 312a and 312b and the ATR element 310. Each channel interface 314a and 314b may correspond to a deeply etched vertical surface of the first substrate 302. For example, each channel interface 312a and 312b may correspond to a silicon-air (Si-air) interface forming a silicon-sample (Si-sample) interface with the sample inserted. The ATR element 310, the first microfluidic channel 312a and the second microfluidic channel 312b are configured such that total internal reflection of light occurs within the ATR element 310 between the first channel interface 314a and the second channel interface 314b.

The second substrate 304 includes one or more light redirecting elements 316 and 320 formed therein. For example, the light redirecting elements 316 and 320 may be curved reflectors (e.g., micro-reflectors or micromirrors). In some examples, the light redirecting elements 316 and 320 may be fabricated in molded parts of the second substrate 304 with an aluminum metallic coating to improve the reflectivity thereof.

The third substrate 306 includes a spectrometer 322 formed therein via, for example, a DRIE process. The spectrometer 322 may include a beam splitter 324, a fixed mirror 326, and a moveable mirror 328. The moveable mirror 328 may be coupled to an actuator 330, such as a MEMS electrostatic actuator.

In the example shown in FIG. 3, input light 332 from a light source (not shown) is input into the ATR element 310 on the first substrate 302. For example, the ATR element 310 may include a V-shaped input interface configured to produce an angle of the input light 332 on the channel interface 314b of the microfluidic channel 312b that is higher than a critical angle to produce total internal reflection of the input light 332 at the channel interface 314b. The input light 332 is then total internal reflected between the channel interfaces 314a and 314b, where the input light 332 is attenuated by respective evanescent waves formed within the sample contained within each of the microfluidic channels 312a and 312b. The attenuated input light is then output from the ATR element 310 as output light 334. For example, the ATR element 310 may include a V-shaped output interface configured to facilitate transmission of the output light 334 reflected from the channel interface 314b of the microfluidic channel 312b.

The output light 334 may be redirected by an optical element 315 (e.g., an inclined reflector or curved reflector) from an in-plane direction with respect to the plane of the first substrate 302 to an out-of-plane direction out-of-plane with respect to the first plane of the first substrate 302. Thus, the optical element 315 receives the output light propagating parallel to the plane of the first substrate 302 and reflects the output light 334 by 90 degrees to facilitate propagation of the output light 334 perpendicular to the plane of the first substrate 302 towards the light redirecting element 316. The optical element 315 may be formed as part of the second substrate 302 or may be an external component (the latter being illustrated). The light redirecting element 316 receives the output light 334 propagating out-of-plane with respect to the plane of the first substrate 302 and reflects the output light by another 90 degrees towards the spectrometer 322 to facilitate propagation of the output light 334 in-plane with respect to the plane of the third substrate 306.

The output light 334 is input to the beam splitter 324 in the spectrometer 322. The beam splitter 324 is configured to split the output light 334 into two beams. One beam is reflected off of the fixed mirror 326 back towards the beam splitter 324, while the other beam is reflected off of the moveable mirror 328 back towards the beam splitter 324. The moveable mirror 328 may be displaced by the actuator 330 to the desired position for reflection of the beam. An optical path length difference (OPD) is then created between the reflected beams that is substantially equal to twice the moving mirror 328 displacement. The reflected beams interfere at the beam splitter 324 to produce an interference beam (e.g., an interference pattern) 336, allowing the temporal coherence of the output light 334 to be measured at each different Optical Path Difference (OPD) offered by the moveable mirror 328. The interference beam (interference pattern) 336 may then be output by the spectrometer 322 and redirected by the light redirection element 320 towards the detector 318 to obtain a spectrum of the sample within the microfluidic channels 312a and 312b. For example, the light redirection element 320 may be a curved reflector configured to focus the interference beam 336 to the active area of the detector 318.

The integrated spectral sensing device design shown in FIG. 3 is a reflector-based design instead of a lens-based design, thus reducing chromatic aberration in the integrated spectral sensing device 300. In addition, the transmission properties of silicon enable the integrated spectral sensing device 300 to operate within an ultra-wide spectral range, limited only by the silicon crystal and detector material. Moreover, the integrated spectral sensing device 300 is shown integrated into a single package (e.g., using the package substrate 308) to produce an inexpensive and simple device. Moreover, the crystal length (e.g., the length of the first substrate 302 containing the ATR element 310) is shown of the same order as the optical mold design dimensions of the second substrate 304 for ease of packaging. However, in other examples, longer crystal designs or shorter crystal designs may be used according to the target number of internal reflections.

Figure 4:
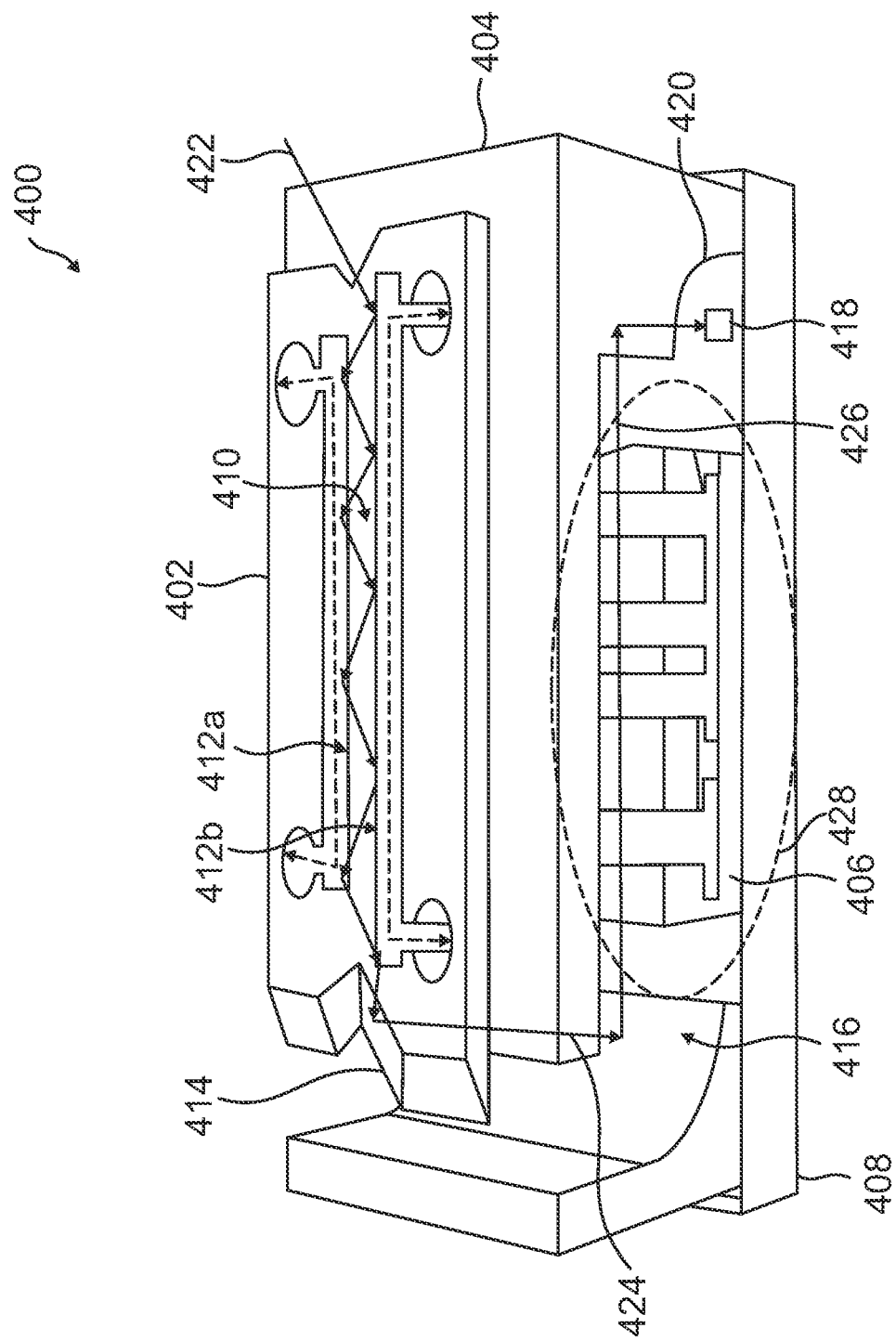
FIG. 4 is a diagram illustrating another example of a multi-substrate integrated spectral sensing device according to some aspects.

FIG. 4 is a diagram illustrating another example of a multi-substrate integrated spectral sensing device 400 according to some aspects. In the example shown in FIG. 4, the integrated spectral sensing device 400 includes three substrates 402, 404, and 406. A first substrate 402 is positioned in a first plane that is parallel to a second plane of a third substrate 406. The integrated spectral sensing device 400 may further include a package substrate 408. The third substrate 406 may be positioned on (e.g., bonded to) the package substrate 408. In addition, a second substrate 404 may be positioned over the third substrate 406 and bonded to the package substrate 408 at respective ends of the second substrate 404. A detector 418 may further be positioned on the package substrate 408. Each of the substrates 402, 406, and 408 may be, for example, a silicon or SOI substrate. In some examples, the second substrate 404 may be a plastic or glass substrate formed using injection molded optics technology.

The first substrate 402 includes an ATR element 410 and two opposing microfluidic channels 412a and 412b. The ATR element 410 and microfluidic channels 412a and 412b are formed within the first substrate 402 via, for example, a DRIE process. Each microfluidic channel 412a and 412b includes a sample (e.g., a fluid) that flows through the microfluidic channels 412a and 412b adjacent to a respective boundary (e.g., a channel interface, similar to the channel interfaces shown in FIG. 3) between the respective microfluidic channel 412a and 412b and the ATR element 410.

The second substrate 404 includes one or more light redirecting elements 416 and 420 formed therein. For example, the light redirecting elements 416 and 420 may be curved reflectors (e.g., micro-reflectors or micromirrors). In some examples, the light redirecting elements 416 and 420 may be fabricated in molded parts of the second substrate 404 with an aluminum metallic coating to improve the reflectivity thereof. The third substrate 406 includes a spectrometer 428 formed therein via, for example, a DRIE process.

In the example shown in FIG. 4, input light 422 from a light source (not shown) is input into the ATR element 410 on the first substrate 402. For example, the ATR element 410 may include a V-shaped input interface configured to produce an angle of the input light 422 that is higher than a critical angle to produce total internal reflection of the input light 422 through the ATR element 410 between the microfluidic channels 412a and 412b. The input light 422 is attenuated by respective evanescent waves formed within the sample contained within each of the microfluidic channels 412a and 412b. The attenuated input light is then output from the ATR element 410 as output light 424.

In the example shown in FIG. 4, the ATR element 410 includes an angled surface 414 for out-of-plane coupling of the output light 424 towards the light redirecting element 416. For example, the angled surface 414 may couple the output light 424 in an out-of-plane direction with respect to the plane of the ATR element 410 (e.g., the plane of the first substrate 402) to the light redirecting element 416. In some examples, the angled surface 414 may be anisotropically etched in the first substrate 402 using, for example, KOH etching. The light redirecting element 416 receives the output light 424 propagating out-of-plane with respect to the plane of the first substrate 402 and redirects the output light 424 (e.g., reflects the output light by 90 degrees) towards the spectrometer 428 in the third substrate 406 to facilitate propagation of the output light 424 in-plane with respect to the plane of the third substrate 406.

The spectrometer 428 produces an interference beam (interference pattern) 426 based on the output light 424, which is redirected by the light redirection element 420 towards the detector 418 to obtain a spectrum of the sample within the microfluidic channels 412a and 412b. For example, the light redirection element 420 may be a curved reflector configured to focus the interference beam 426 to the active area of the detector 418.

Figure 5:
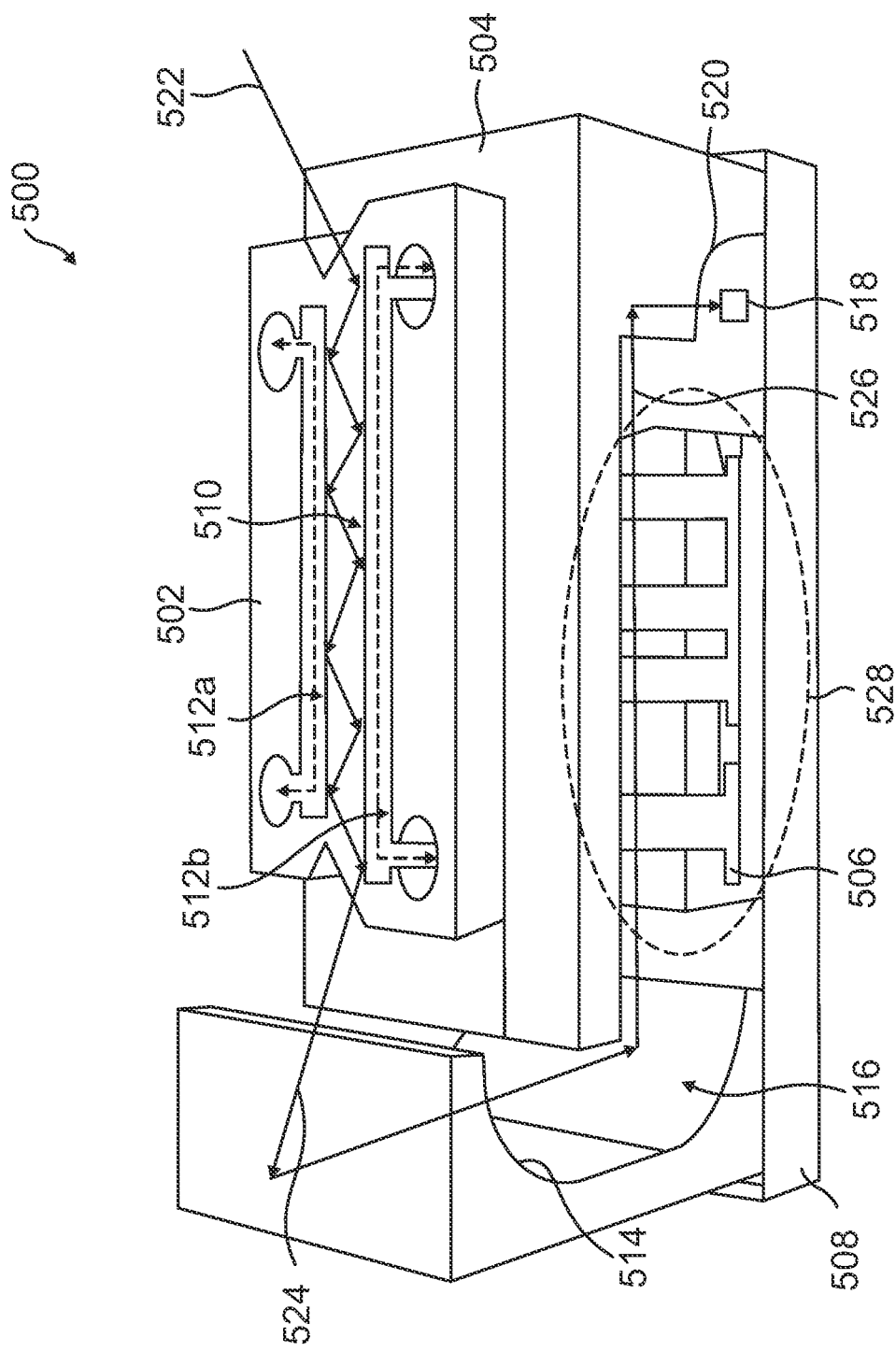
FIG. 5 is a diagram illustrating another example of a multi-substrate integrated spectral sensing device according to some aspects.

FIG. 5 is a diagram illustrating another example of a multi-substrate integrated spectral sensing device 500 according to some aspects. In the example shown in FIG. 5, the integrated spectral sensing device 500 includes three substrates 502, 504, and 506. A first substrate 502 is positioned in a first plane that is parallel to a second plane of a third substrate 506. The integrated spectral sensing device 500 may further include a package substrate 508. The third substrate 506 may be positioned on (e.g., bonded to) the package substrate 508. In addition, a second substrate 504 may be positioned over the third substrate 506 and bonded to the package substrate 508 at respective ends of the second substrate 504. A detector 518 may further be positioned on the package substrate 508. Each of the substrates 502, 506, and 508 may be, for example, a silicon or SOI substrate. In some examples, the second substrate 504 may be a plastic or glass substrate formed using injection molded optics technology.

The first substrate 502 includes an ATR element 510 and two opposing microfluidic channels 512a and 512b. The ATR element 510 and microfluidic channels 512a and 512b are formed within the first substrate 502 via, for example, a DRIE process. Each microfluidic channel 512a and 512b includes a sample (e.g., a fluid) that flows through the microfluidic channels 512a and 512b adjacent to a respective boundary (e.g., a channel interface, similar to the channel interfaces shown in FIG. 3) between the respective microfluidic channel 512a and 512b and the ATR element 510.

The second substrate 504 includes one or more light redirecting elements 514, 516, and 520 formed therein. For example, the light redirecting elements 514, 516 and 520 may be curved reflectors (e.g., micro-reflectors or micro-mirrors). In some examples, the light redirecting elements 514, 516, and 520 may be fabricated in molded parts of the second substrate 504 with an aluminum metallic coating to improve the reflectivity thereof. The third substrate 506 includes a spectrometer 528 formed therein via, for example, a DRIE process.

In the example shown in FIG. 5, input light 522 from a light source (not shown) is input into the ATR element 510 on the first substrate 502. For example, the ATR element 510 may include a V-shaped input interface configured to produce an angle of the input light 522 that is higher than a critical angle to produce total internal reflection of the input light 522 through the ATR element 510 between the microfluidic channels 512a and 512b. The input light 522 is attenuated by respective evanescent waves formed within the sample contained within each of the microfluidic channels 512a and 512b. The attenuated input light is then output from the ATR element 510 as output light 524.

In the example shown in FIG. 5, the output light 524 is directed towards the light redirecting element 514 for out-of-plane coupling to the light redirecting element 516. For example, the light redirecting element 514 is configured to receive the output light 524 in a first plane of the ATR element 510 (e.g., the first substrate 502) and to reflect (redirect) the output light 524 in an out-of-plane direction with respect to the first plane towards the light redirecting element 516. The light redirecting element 516 receives the output light 524 propagating out-of-plane with respect to the plane of the first substrate 502 and redirects the output light 524 (e.g., reflects the output light by 90 degrees) from the out-of-plane direction to an in-plane direction with respect to a second plane of the third substrate 506 towards the spectrometer 528.

The spectrometer 528 produces an interference beam (interference pattern) 526 based on the output light 524, which is redirected by the light redirection element 520 towards the detector 518 to obtain a spectrum of the sample within the microfluidic channels 512a and 512b. For example, the light redirection element 520 may be a curved reflector configured to focus the interference beam 526 to the active area of the detector 518.

Figure 6:
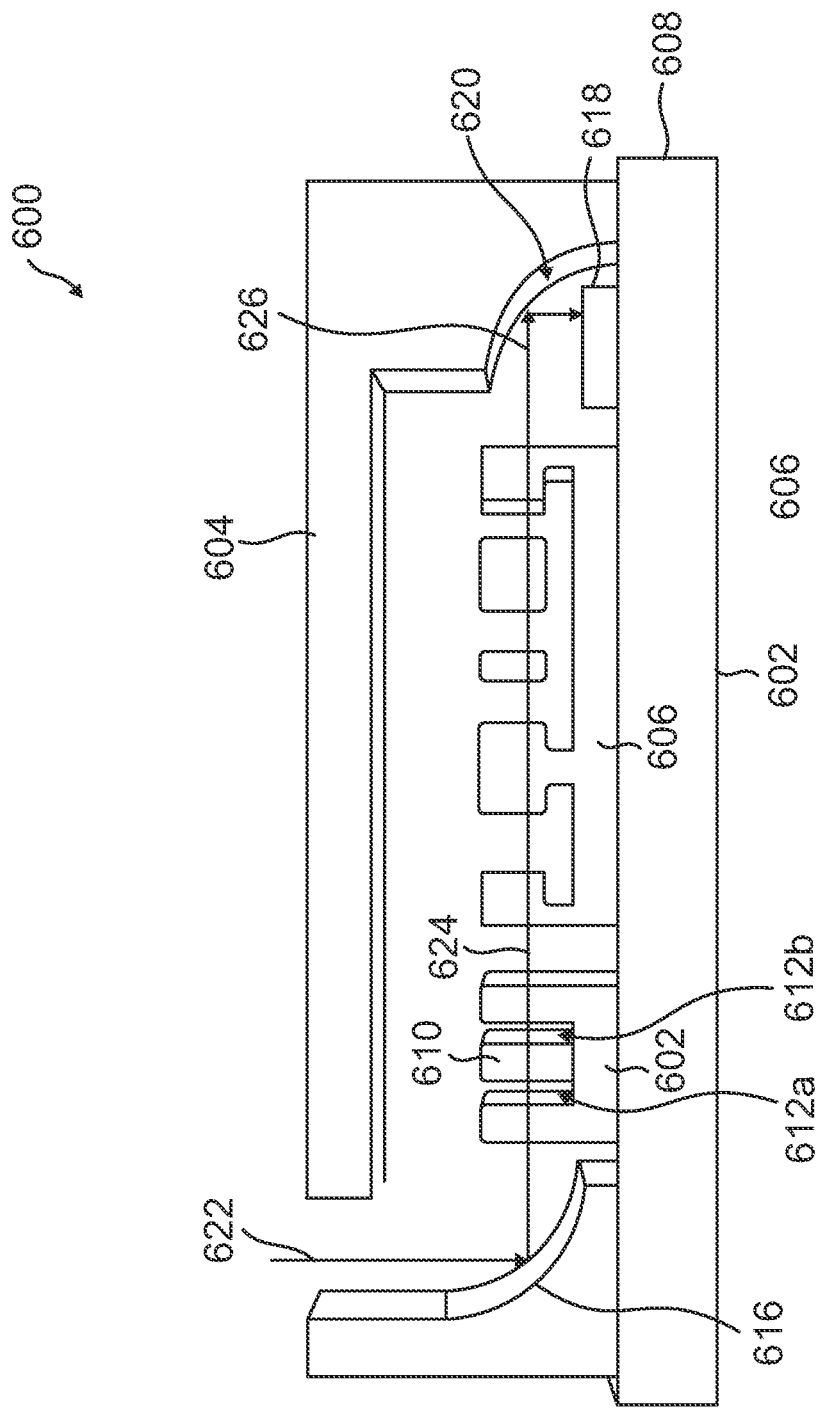
FIG. 6 is a diagram illustrating another example of a multi-substrate integrated spectral sensing device according to some aspects.

FIG. 6 is a diagram illustrating another example of a multi-substrate integrated spectral sensing device 600 according to some aspects. In the example shown in FIG. 6, the integrated spectral sensing device 600 again includes three substrates (e.g., a first substrate 602, second substrate 604, and third substrate 606). However, the first substrate 602 and the third substrate 606 are positioned in a same plane. The integrated spectral sensing device 600 may further include a package substrate 608. The first substrate 602 and the third substrate 606 may be positioned on (e.g., bonded to) the package substrate 608. In addition, the second substrate 604 may be positioned over the first substrate 602 and the third substrate 606 and bonded to the package substrate 608 at respective ends of the second substrate 604. A detector 618 may further be positioned on the package substrate 608. Each of the substrates 602, 606, and 608 may be, for example, a silicon or SOI substrate. In some examples, the second substrate 604 may be a plastic or glass substrate formed using injection molded optics technology.

The first substrate 602 includes an ATR element 610 and two opposing microfluidic channels 612a and 612b. The ATR element 610 and microfluidic channels 612a and 612b are formed within the first substrate 602 via, for example, a DRIE process. Each microfluidic channel 612a and 612b includes a sample (e.g., a fluid) that flows through the microfluidic channels 612a and 612b adjacent to a respective boundary (e.g., a channel interface, similar to the channel interfaces shown in FIG. 3) between the respective microfluidic channel 612a and 612b and the ATR element 610.

The second substrate 604 includes one or more light redirecting elements 616 and 620 formed therein. For example, the light redirecting elements 616 and 620 may be curved reflectors (e.g., micro-reflectors or micromirrors). In some examples, the light redirecting elements 616 and 620 may be fabricated in molded parts of the second substrate 604 with an aluminum metallic coating to improve the reflectivity thereof. The third substrate 606 includes a spectrometer 628 formed therein via, for example, a DRIE process.

In the example shown in FIG. 6, input light 622 from a light source (not shown) is input to the integrated spectral sensing device 600 in an out-of-plane direction with respect to a plane of the first substrate 602 and the third substrate 606 towards the light redirecting element 616. The light redirecting element 616 is configured to receive the input light 622 in the out-of-plane direction and to direct the input light 622 towards the first substrate 602 (e.g., redirect/reflect the input light 622 by 90 degrees towards the first substrate 602). The input light 622 may impinge on the ATR element 610 at an angle of incidence that is higher than a critical angle to produce total internal reflection of the input light 622 through the ATR element 610 between the microfluidic channels 612a and 612b. The input light 622 is attenuated by respective evanescent waves formed within the sample contained within each of the microfluidic channels 612a and 612b. The attenuated input light is then output from the ATR element 610 as output light 624 towards the spectrometer 628 in the third substrate 606.

The spectrometer 628 produces an interference beam (interference pattern) 626 based on the output light 624, which is redirected by the light redirection element 620 towards the detector 618 to obtain a spectrum of the sample within the microfluidic channels 612a and 612b. For example, the light redirection element 620 may be a curved reflector configured to focus the interference beam 626 to the active area of the detector 618.

FIGS. 7A and 7B are diagrams illustrating examples of a compact ATR spectrometer 700 of an integrated spectral sensing device according to some aspects. In the examples shown in FIGS. 7A and 7B, the compact ATR spectrometer 700 includes a spectrometer 704, an ATR element 706, and a microfluidic channel 708 integrated on a same substrate 702. The substrate 702 may be, for example, a silicon or SOI substrate. The ATR element 706 may correspond to or include a waveguide for passing light therethrough. The microfluidic channel 708 includes a sample 712 (e.g., a fluid) that flows through the microfluidic channel 708 between input and output microfluidic ports 710. The sample 712 flows adjacent to a boundary 730 between the microfluidic channel 708 and the ATR element 706. The boundary 730 corresponds to a channel interface between the ATR element 706 and the microfluidic channel 708 and may be formed by a surface of the ATR element 706 against which the sample 712 is in contact. For example, the boundary or channel interface 730 may correspond to a vertical surface of the ATR element 706 etched in the substrate 702 (e.g., via a DRIE process) that further serves as an internal surface of the microfluidic channel 708. Thus, the channel interface 730 corresponds to a Si-air/Si-sample interface.

The spectrometer 704 shown in FIGS. 7A and 7B is a deeply etched micromachined MEMS interferometer. The MEMS interferometer includes a beam splitter 716, a fixed minor 718, a moving minor 720, and an actuator 722 (e.g., an electrostatic MEMS actuator) coupled to the moving minor 720. In addition, one or more guiding structures 726 and 732 may be etched in the substrate 702 (e.g., via a DRIE process) to couple the MEMS interferometer 704 to the ATR element 706 and microfluidic channel 708. Each guiding structure 726 and 732 may be a Si-air interface.

In the examples shown in FIGS. 7A and 7B, input light 714 may be coupled into the compact ATR spectrometer 700. In some examples, the integrated spectral sensing device may include a second substrate (not shown) containing one or more light redirecting elements (e.g., molded free-space reflectors), as shown in FIGS. 3-6, coupled to the substrate 702. The input light 714 may be directed from the molded free-space reflector(s) to the MEMS interferometer 704, where the optical path difference is varied between the two paths of the fixed mirror 718 and the moving mirror 720 using the actuator 722 to produce an interference beam 724. The interference beam 724 may then be directed to the channel interface 730 between the ATR element 706 and the microfluidic channel 708 via the guiding structure 726. The guiding structure 726 is designed to produce an incident angle of the interference beam 724 on the channel interface 730 greater than the critical angle of Si-sample channel interface 730 to produce total internal reflection of the interference beam 724 at the channel interface 730.

In the example shown in FIG. 7A, the interference beam 724 is subjected to a single total internal reflection and the resulting evanescent wave in the sample 712 attenuates the interference beam 724 to produce output light 728 that may be directed to a detector (not shown) via an output of the compact ATR spectrometer 700. In some examples, the reflected output light 728 carrying the information from the sample 712 may be collected by an output light redirecting element (e.g., molded in a second substrate coupled to the substrate 702) after refraction at the output of the compact ATR spectrometer 700. The output light redirecting element may redirect the output light 728 to the detector, as shown in FIGS. 3-6. In the example shown in FIG. 7B, multiple total internal reflections of the interference beam 724 are achieved by using the additional guiding structure 732. The guiding structure 732 is designed to produce an incidence angle of the interference beam 724 above the internal reflection critical angle at each reflection.

Figure 8:
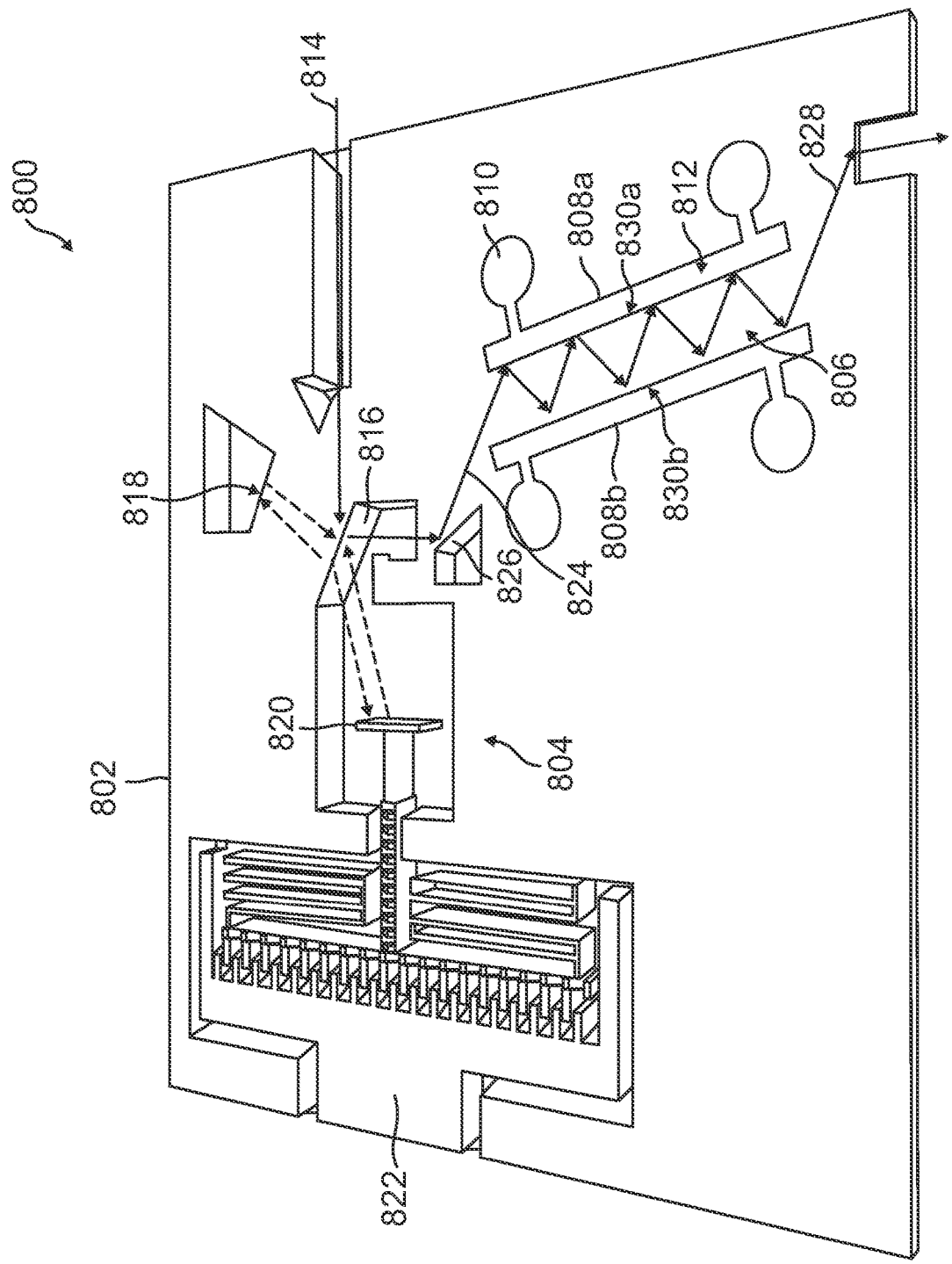
FIG. 8 is a diagram illustrating another example of a compact ATR spectrometer of an integrated spectral sensing device according to some aspects.

FIG. 8 is a diagram illustrating another example of a compact ATR spectrometer 800 of an integrated spectral sensing device according to some aspects. The compact ATR spectrometer 800 includes a spectrometer 804, an ATR element 806, and two opposing microfluidic channels 808a and 808b integrated on a same substrate 802. The substrate 802 may be, for example, a silicon or SOI substrate. The microfluidic channels 808a and 808b each include a sample 812 (e.g., a fluid) that flows through the microfluidic channels 808a and 808b between respective input and output microfluidic ports 810 thereof.

Typically, the sample 812 is measured from one side of the ATR crystal in either macro-ATR or micro-ATR. However, the in-plane design of the multi-substrate integrated spectral sensing device shown in FIGS. 3-6 or the compact ATR spectrometer shown in FIGS. 8 and 9 allows inserting the sample on both sides of the ATR element 806 by trapping the light between the two microfluidic channels 808a and 808b while preserving the incident angle higher than the critical angle. This design increases the ATR sensitivity due to the higher number of reflections that may be achieved.

The sample 812 flows adjacent to a respective boundary 830a and 830b between the corresponding microfluidic channels 808a and 808b and the ATR element 806. Each of the boundaries 830a and 830b corresponds to a respective channel interface between the ATR element 806 and the respective microfluidic channels 808a and 808b and may be formed by a respective surface of the ATR element 806 against which the sample 812 is in contact. For example, the channel interfaces 830a and 830b may each correspond to a Si-air/Si-sample interface.

The spectrometer 804 is a deeply etched micromachined MEMS interferometer. The MEMS interferometer includes a beam splitter 816, a fixed minor 818, a moving minor 820, and an actuator 822 (e.g., an electrostatic MEMS actuator) coupled to the moving minor 820. In addition, a guiding structure 826 may be etched in the substrate 802 to couple the MEMS interferometer 804 to the ATR element 806 and microfluidic channels 808a and 808b. The guiding structure 826 may be a Si-air interface.

In the example shown in FIG. 8, input light 814 may be coupled into the compact ATR spectrometer 800. In some examples, the integrated spectral sensing device may include a second substrate (not shown) containing one or more light redirecting elements (e.g., molded free-space reflectors), as shown in FIGS. 3-6, coupled to the substrate 802. The input light 814 may be directed from the molded free-space reflector(s) to the MEMS interferometer 804, where the optical path difference is varied between the two paths of the fixed mirror 818 and the moving mirror 820 using the actuator 822 to produce an interference beam 824. The interference beam 824 may then be directed to the ATR element 806 and the microfluidic channels 808a and 808b via the guiding structure 826. The guiding structure 826 is designed to produce an incident angle of the interference beam 824 on the channel interface 830a greater than the critical angle of Si-sample channel interface 830a to produce multiple total internal reflections of the interference beam 824 within the ATR element 806 between the channel interfaces 830a and 830b.

The multiple total internal reflections of the interference beam 824 produces an evanescent wave in the sample 812 that attenuates the interference beam 824 to produce output light 828 that may be directed to a detector (not shown) via an output of the compact ATR spectrometer 800. In some examples, the resulting output light 828 carrying the information from the sample 812 may be collected by an output light redirecting element (e.g., molded in a second substrate coupled to the substrate 802) after refraction at the output of the compact ATR spectrometer 800. The output light redirecting element may redirect the output light 828 to the detector, as shown in FIGS. 3-6.

Figure 9:
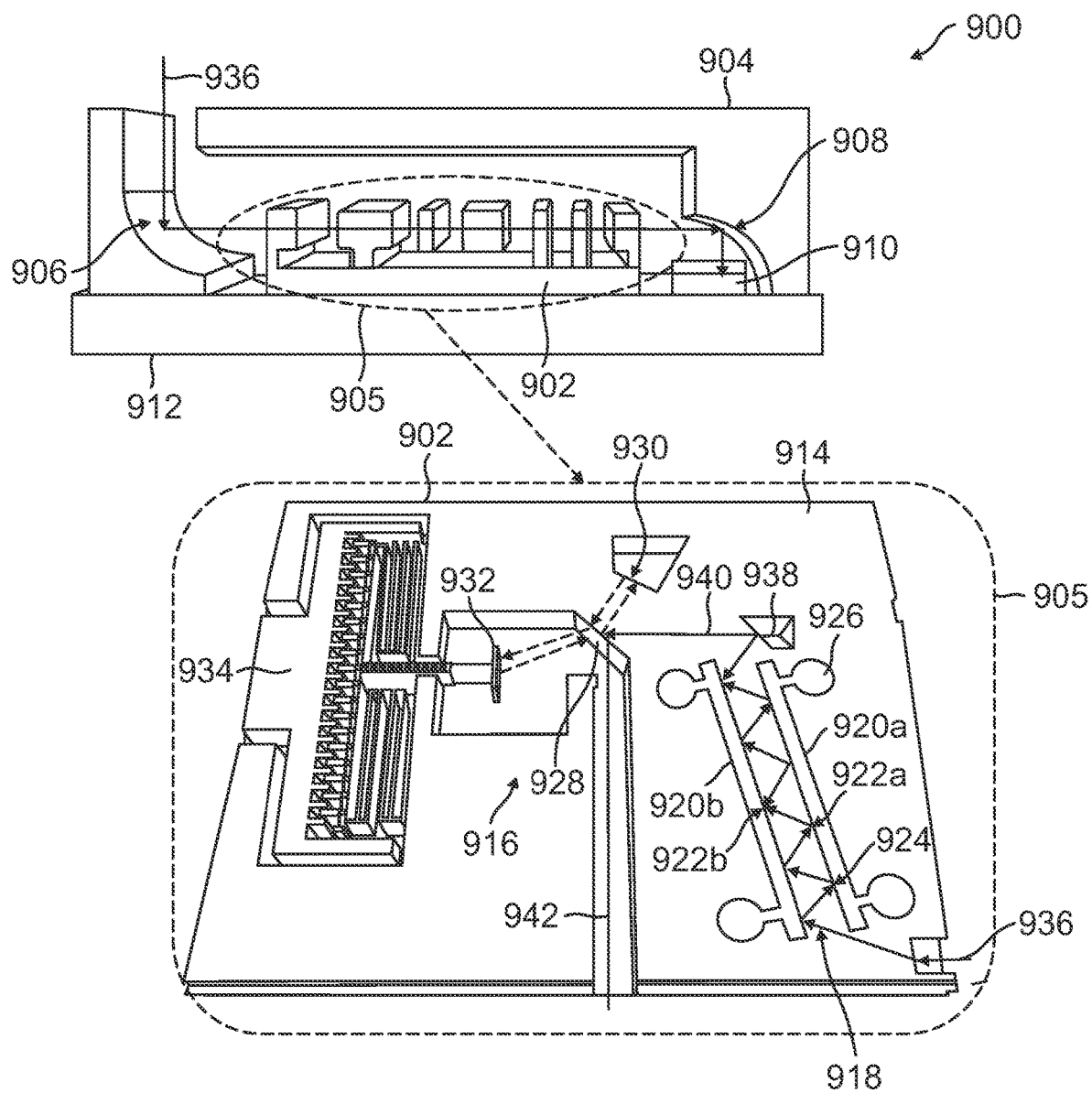
FIG. 9 is a diagram illustrating an example of an integrated spectral sensing device including a compact ATR spectrometer according to some aspects.

FIG. 9 is a diagram illustrating an example of an integrated spectral sensing device 900 including a compact ATR spectrometer 905 according to some aspects. The spectral sensing device 900 includes a first substrate 902 and a second substrate 904. The first substrate 902 includes the compact ATR spectrometer 905. The second substrate 904 may include one or more light redirecting elements 906 and 908 formed therein. For example, the light redirecting elements 906 and 908 may be curved reflectors (e.g., microreflectors or micromirrors). In some examples, the light redirecting elements 906 and 908 may be fabricated in molded parts of the second substrate 904 with an aluminum metallic coating to improve the reflectivity thereof.

The integrated spectral sensing device 900 may further include a package substrate 912. The first substrate 902 may be positioned on (e.g., bonded to) the package substrate 912. In addition, the second substrate 904 may be positioned over the first substrate 902 and bonded to the package substrate 912 at respective ends of the second substrate 904. A detector 910 may further be positioned on the package substrate 912. Each of the substrates 902 and 912 may be, for example, a silicon or SOI substrate. In some examples, the second substrate 904 may be a plastic or glass substrate formed using injection molded optics technology.

The compact ATR spectrometer 905 includes a spectrometer 916, an ATR element 918, and two opposing microfluidic channels 920a and 920b integrated on the first substrate 902. The microfluidic channels 920a and 920b each include a sample 924 (e.g., a fluid) that flows through the microfluidic channels 920a and 920b between respective input and output microfluidic ports 926 thereof. The sample 924 flows adjacent to a respective boundary 922a and 922b between the corresponding microfluidic channels 920a and 920b and the ATR element 918. Each of the boundaries 922a and 922b corresponds to a respective channel interface between the ATR element 918 and the respective microfluidic channels 920a and 920b. For example, the channel interfaces 922a and 922b may each correspond to a Si-air/Si-sample interface.

The spectrometer 916 is a deeply etched micromachined MEMS interferometer. The MEMS interferometer includes a beam splitter 928, a fixed mirror 930, a moving mirror 932, and an actuator 934 (e.g., an electrostatic MEMS actuator) coupled to the moving mirror 932. In addition, a guiding structure 938 may be etched in the substrate 902 to couple the MEMS interferometer 916 to the ATR element 918 and microfluidic channels 920a and 920b. The guiding structure 938 may be a Si-air interface.

In the example shown in FIG. 9, input light 936 may be coupled into the compact ATR spectrometer 905 via the light redirecting element 906. For example, the light redirecting element 906 may receive the input light 936 in an out-of-plane direction with respect to a plane of the first substrate 902 and to direct the input light 936 towards the first substrate 902 (e.g., redirect/reflect the input light 936 by 90 degrees towards the first substrate 902). The input light 936 may be refracted at an input to the compact ATR spectrometer 905 to impinge on the channel interface 922b between the microfluidic channel 920b and the ATR element 918 at an angle of incidence that is higher than a critical angle (e.g., the critical angle of the Si-sample interface of channel interface 922b) to produce multiple total internal reflections of the input light 936 through the ATR element 918 between the microfluidic channels 920a and 920b. The input light 936 is attenuated by respective evanescent waves formed within the sample 924 contained within each of the microfluidic channels 920a and 920b. The attenuated input light is then output from the ATR element 918 as output light 940 and is refracted towards an input of the MEMS interferometer 916 via the guiding structure 938.

Within the MEMS interferometer 916, the optical path difference is varied between the two paths of the fixed mirror 930 and the moving mirror 932 using the actuator 934 to produce an interference beam (interference pattern) 942 based on the output light 940. The interference beam 942 output by the MEMS interferometer 916 is redirected by the light redirection element 908 towards the detector 910 to obtain a spectrum of the sample 924 within the microfluidic channels 920a and 920b. For example, the light redirection element 908 may be a curved reflector configured to focus the interference beam 942 to the active area of the detector 910.

In ATR spectroscopy, the light penetration depth inside the sample for a single reflection is given in Equation (Equation 1), where $d_p$, $\lambda$, $\theta$, $n_1$ and $n_2$ are the penetration depth, wavelength of radiation, incident angle, ATR crystal refractive index and sample refractive index. Hence, the light incidence angle and number of reflections inside the crystal may be selected based on the application and measured absorption peaks.

$$d_p = \frac{\lambda}{2\pi\sqrt{n_1^2\sin^2\theta - n_2^2}} \quad \text{(Equation 1)}$$

In some applications, a small ATR penetration depth is preferable to reduce strong water infrared absorption that may totally block light. However, in other applications, an enhanced effective interaction length between the infrared light and the sample may enhance absorption of weak infrared (IR) signals above the noise level of the spectrometer. Examples of such applications include, but are not limited to, oil analysis and biological samples sensing where samples are commonly dried before measuring them using IR spectroscopy. While increasing the number of reflections by increasing the ATR crystal length or reducing the ATR thickness may enhance IR absorption, there may be limitations on the length, due to limited design area and fabrication difficulties, and on the thickness, due to beam truncation at the input and output interfaces that affects optical throughput of the device.

The in-plane ATR element designs shown in FIGS. 2-9 above allow forming ATR IREs with the desired shape and dimensions depending on the measured sample. Hence, the incidence angle and number of reflections may be adapted in the design. In addition, ATR crystals may be designed to enhance the effective path length by increasing the number of reflections without changing the crystal dimensions. These designs may allow for different implementations of the ATR substrate or compact ATR spectrometer using different optical designs for the molded light redirecting element(s).

Figure 10:
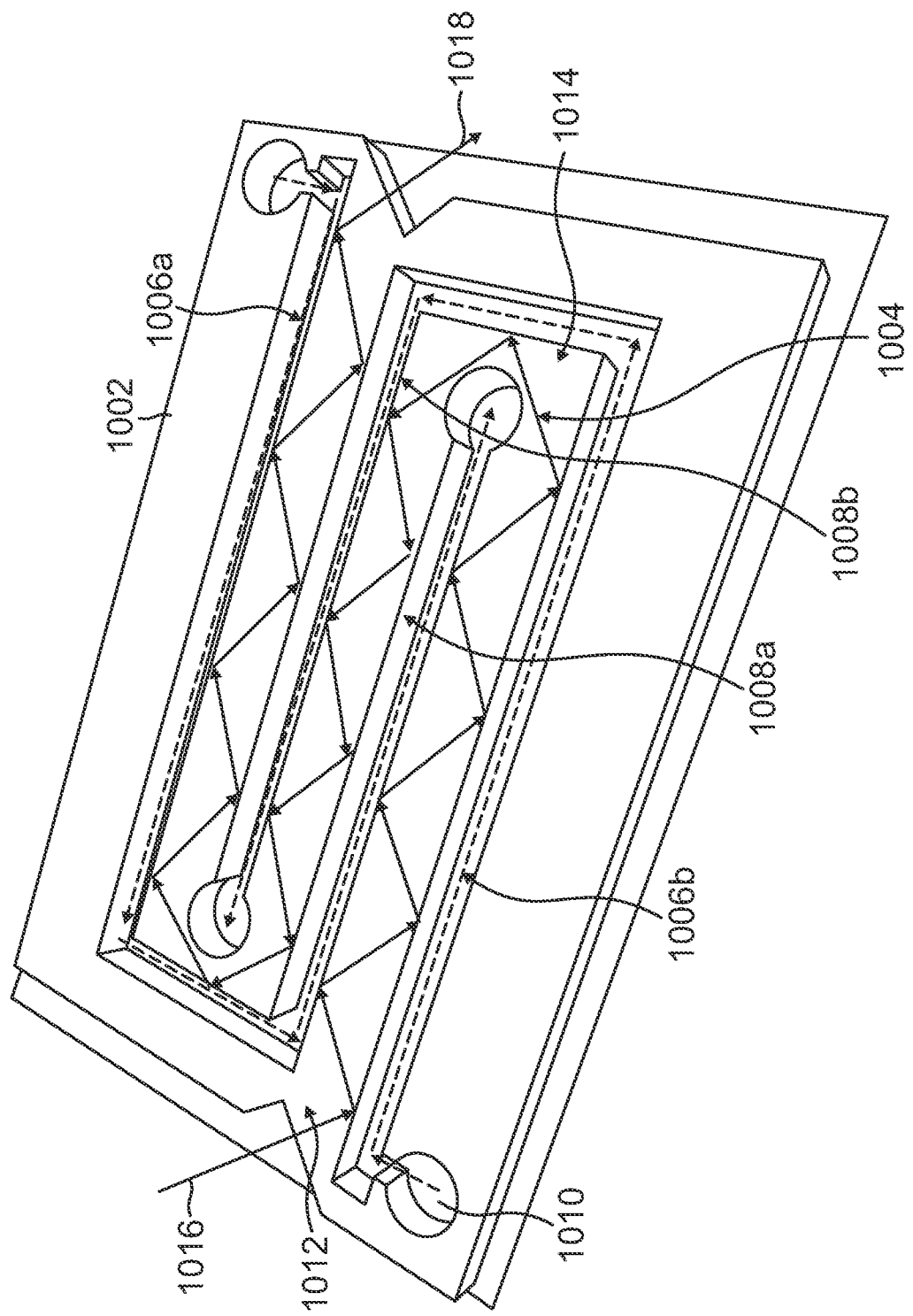
FIG. 10 is a diagram illustrating an example of an ATR element design according to some aspects.

FIG. 10 is a diagram illustrating an example of an ATR element design according to some aspects. The ATR element design shown in FIG. 10 is a multi-path ATR element design that enables a longer path length to be obtained in the same area. Increasing the effective path length may further increase the absorbance of the sample without any loss in power and signal to noise ratio. However, there may be bending losses (of the light) that cause power loss and affect the spectrometer's detection limits. Hence, the ATR element design shown in FIG. 10 may be optimized to minimize the bending losses, while enhancing the absorption due to a higher number of reflections.

Figure 7:
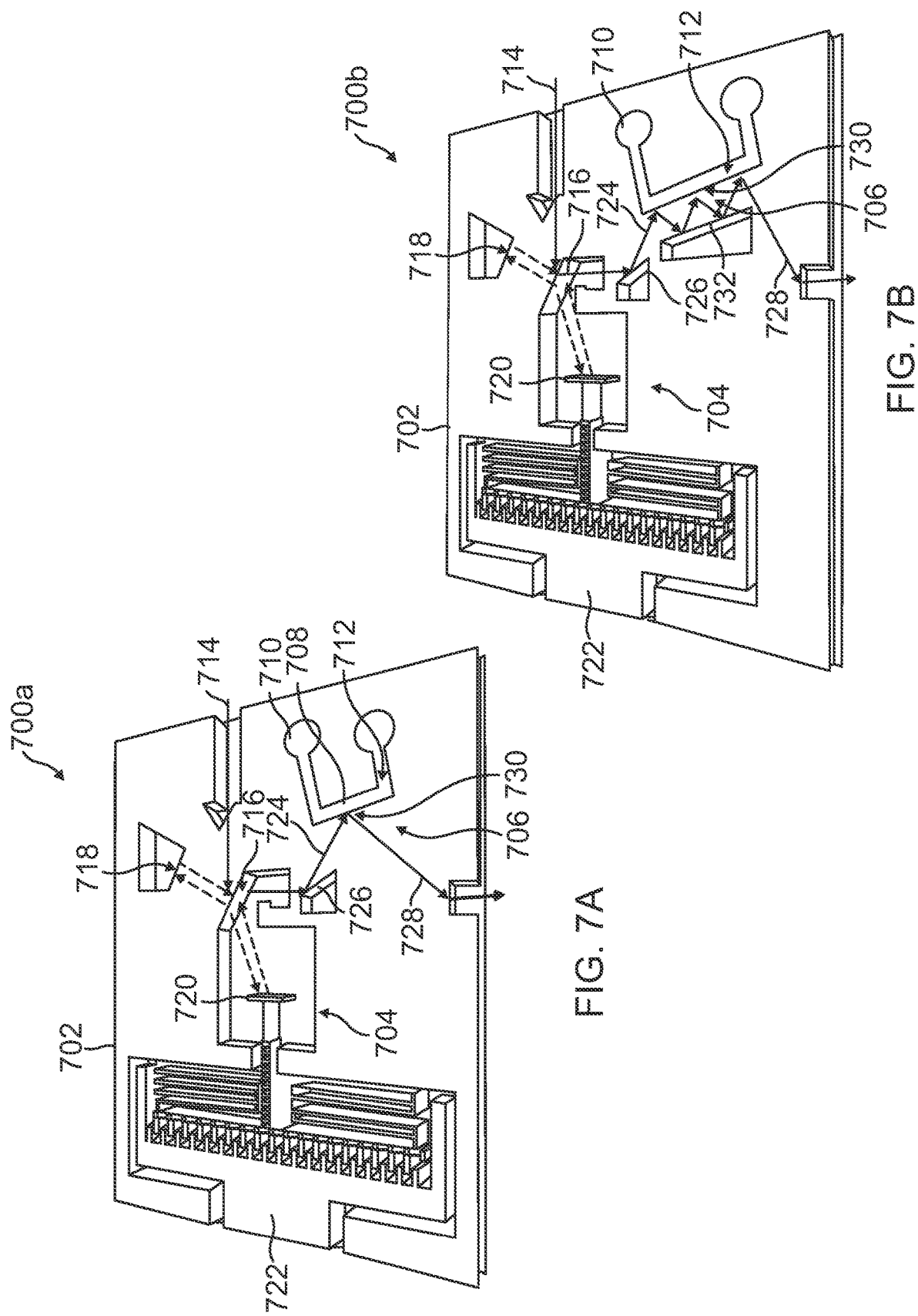
FIGS. 7A and 7B are diagrams illustrating examples of a compact ATR spectrometer of an integrated spectral sensing device according to some aspects.

The ATR element design includes a substrate 1002 having an ATR element 1004 and microfluidic channels 1006a and 1006b formed therein (e.g., via a DRIE process). The substrate may be, for example, a silicon or SOI substrate. In some examples, the spectrometer may be formed on the same substrate 1002 as the ATR element 1004, as shown in FIGS. 7-9, or on a different, separate substrate, as shown in FIGS. 3-6.

The microfluidic channels 1006a and 1006b each include a sample (e.g., a fluid) that flows through the microfluidic channels 1006a and 1006b between respective input and output microfluidic ports 1010 thereof. The sample flows adjacent to a respective channel interface 1008a and 1008b between the corresponding microfluidic channels 1006a and 1006b and the ATR element 1004. For example, the channel interfaces 1008a and 1008b may each correspond to a Si-air/Si-sample interface.

In the example shown in FIG. 10, the ATR element 1004 has a waveguide pattern formed by the channel interfaces 1008a and 1008b. The waveguide pattern includes an array of parallel waveguides 1012 optically coupled at respective ends 1014 thereof. As such, input light 1016 incident on the channel interface 1008b at an angle greater than the critical angle of the Si-sample channel interface 1008b is reflected via total internal reflection through the waveguide pattern of parallel waveguides 1012 to produce output light 1018. The output light 1018 is attenuated by an evanescent wave formed in the sample based on the total internal reflected input light 1016.

Figure 11:
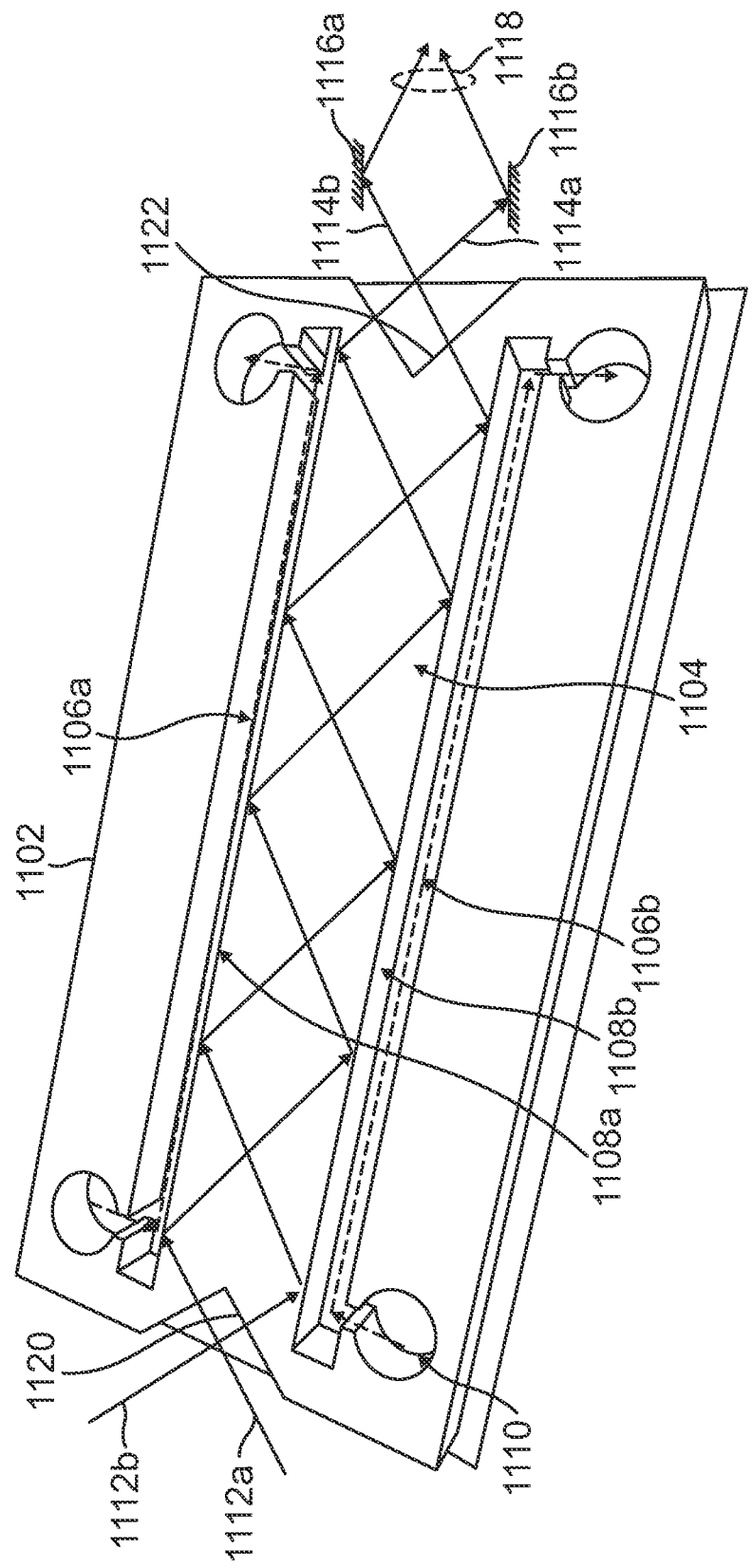
FIG. 11 is a diagram illustrating another example of an ATR element design according to some aspects.

FIG. 11 is a diagram illustrating another example of an ATR element design according to some aspects. The ATR element design includes a substrate 1102 having an ATR element 1104 and microfluidic channels 1106a and 1106b formed therein (e.g., via a DRIE process). The substrate may be, for example, a silicon or SOI substrate. In some examples, the spectrometer may be formed on the same substrate 1102 as the ATR element 1104, as shown in FIGS. 7-9, or on a different, separate substrate, as shown in FIGS. 3-6.

The microfluidic channels 1106a and 1106b each include a sample (e.g., a fluid) that flows through the microfluidic channels 1106a and 1106b between respective input and output microfluidic ports 1110 thereof. The sample flows adjacent to a respective channel interface 1108a and 1108b between the corresponding microfluidic channels 1106a and 1106b and the ATR element 1104. For example, the channel interfaces 1108a and 1108b may each correspond to a Si-air/Si-sample interface.

The ATR element design shown in FIG. 11 is based on inputting two IR beams 1112a and 1112b to the ATR element 1104 using V-shaped input and output interfaces 1120 and 1122, respectively. The two input beams 1112a and 1112b may originate from two IR sources or a single light source with a beam splitter and coupling optics (e.g., on-chip or external optical reflectors) that reflect the input beams 1112a and 1112b to the V-shaped input interface 1120. For example, the V-shaped input interface 1120 is configured to receive a first input beam 1112a and direct the first input beam 1112a towards a first channel interface 1108a at an angle higher than the critical angle to produce total internal reflection of the first input beam 1112a through the ATR element 1104 between the channel interfaces 1108a and 1108b. The V-shaped interface 1120 is further configured to receive a second input beam 1112b and direct the second input beam 1112b towards a second channel interface 1108b at an angle higher than the critical angle to produce total internal reflection of the first input beam 1112a through the ATR element between the channel interfaces 1108a and 1108b.

Each input light beam 1112a and 1112b is attenuated by respective evanescent waves formed within the sample contained within each of the microfluidic channels 1106a and 1106*b*. The attenuated input light beams are then output from the ATR element 1104 as output light beams 1114*a* and 1114*b* via the V-shaped output interface 1122. For example, a first output beam 1114*a* produced from total internal reflection of the first input beam 1112*a* may be output from the second channel interface 1108*b* via the V-shaped output interface 1122. In addition, a second output beam 1114*b* produced from total internal reflection of the second input beam 1112*b* may be output from the first channel interface 1108*a* via the V-shaped output interface 1122. The output beams 1114*a* and 1114*b* may be focused by reflectors 1116*a* and 1116*b* onto the spectrometer. For example, the V-shaped output interface 1122 may be configured to direct the first output beam 1114*a* to a first reflector 1116*a* and the second output beam 1114*b* to a second reflector 1116*b* for combination of the first and second output light beams 1114*a* and 1114*b* to produce output light 1118 that is focused onto the spectrometer input.

In the ATR element design shown in FIG. 11, the number of internal reflections is doubled inside the ATR element 1104. In some examples, the IR beam spot size may be smaller than input interface 1120, i.e., no truncation at the input.

Figure 12A:
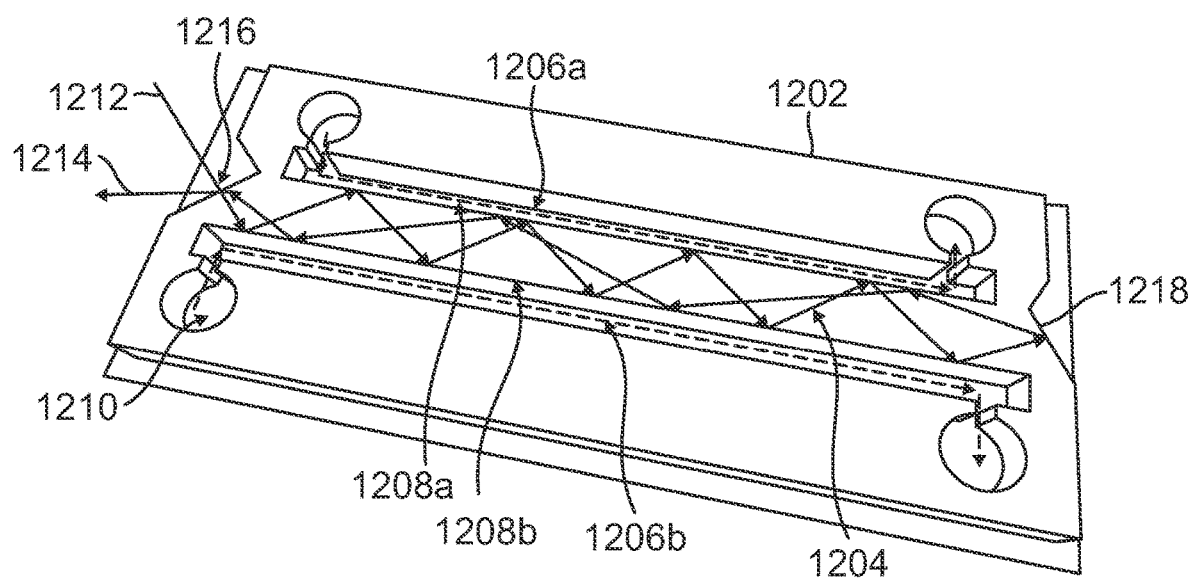
FIGS. 12A and 12B are diagrams illustrating another example of an ATR element design according to some aspects.
Figure 12B:
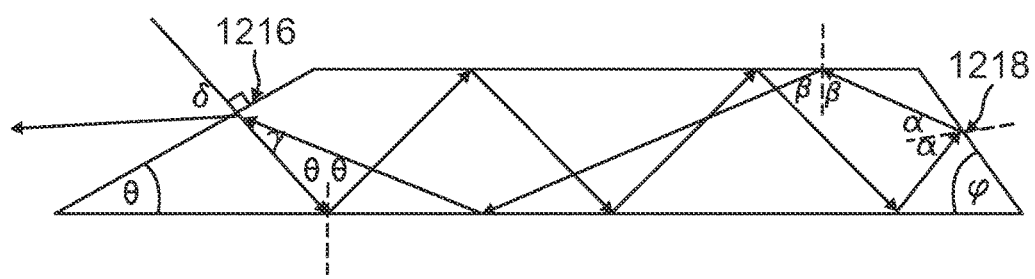

FIGS. 12A and 12B are diagrams illustrating another example of an ATR element design according to some aspects. The ATR element design shown in FIG. 12A includes a substrate 1202 having an ATR element 1204 and microfluidic channels 1206*a* and 1206*b* formed therein (e.g., via a DRIE process). The substrate may be, for example, a silicon or SOI substrate. In some examples, the spectrometer may be formed on the same substrate 1202 as the ATR element 1204, as shown in FIGS. 7-9, or on a different, separate substrate, as shown in FIGS. 3-6.

The microfluidic channels 1206*a* and 1206*b* each include a sample (e.g., a fluid) that flows through the microfluidic channels 1206*a* and 1206*b* between respective input and output microfluidic ports 1210 thereof. The sample flows adjacent to a respective channel interface 1208*a* and 1208*b* between the corresponding microfluidic channels 1206*a* and 1206*b* and the ATR element 1204. For example, the channel interfaces 1208*a* and 1208*b* may each correspond to a Si-air/Si-sample interface.

The ATR element design shown in FIG. 12A is based on having two light paths back and forth inside the ATR element 1204, while the input and output are on a single side of the ATR element 1204. For example, the ATR element 1204 may include an input-output interface 1216 on a first side thereof and a rear interface 1218 on a second side thereof opposite the first side. The ATR element 1204 is configured to receive input light 1212 via the input-output interface 1216. The input light 1212 may impinge a channel interface (e.g., channel interface 1208*b*) at an angle greater than the critical angle to produce total internal reflection of the input light 1212 through the ATR element 1204 between the channel interfaces 1208*a* and 1208*b* towards the rear interface 1218. The rear interface 1218 may further be configured to reflect the input light via total internal reflection back through the ATR element 1204 between the channel interfaces 1208*a* and 1208*b* to produce output light 1214 that may be output via the input-output interface 1216. The output light 1214 is attenuated by an evanescent wave formed in the sample based on the total internal reflected input light 1214.

The ATR element design shown in FIG. 12A increases the number of reflections within the same ATR element length. As further illustrated in FIG. 12B, the two light paths (back and forth) in the ATR element 1204 may be achieved using two different face angles ($\theta$, $\varphi$), one on either side of the ATR element. For example, the input-output interface 1216 may have a first face angle $\theta$, and the rear interface 1218 may have a second face angle $\varphi$. The first face angle $\theta$ may be configured to produce the total internal reflection of the input light 1212 at a channel interface (e.g., channel interface 1208*b*) of the ATR element 1204 when the input light is incident normal to the input-output interface 1216. The second face angle may be configured to produce total internal reflection of the input light 1212 at the rear interface 1218 and the other channel interface (e.g., channel interface 1208*a*) of the ATR element. In addition, the second face angle may be configured to produce refraction of the output light 1214 at the input-output interface 1216.

Thus, the first face angle (input-output face angle ($\theta$)) is higher than the critical angle of the channel interface 1208*b* (e.g., the interface between the ATR element 1204 and the sample) as follows:

$$\theta > \sin^{-1}(n_2/n_1), \tag{Equation 2}$$

where $n_1$ and $n_2$ are the ATR element refractive index and sample refractive index, respectively. In addition, the second face angle (rear face angle ($\varphi$)) is configured to ensure total internal reflection of light on the rear interface 1218 as follows:

$$\varphi > \sin^{-1}(n_{air}/n_1) \to \varphi > \theta + \sin^{-1}(n_{air}/n_1) \tag{Equation 3}$$

where $n_{air}$ is the air refractive index.

Furthermore, the rear face angle ($\varphi$) is further configured to ensure total internal reflection of light on the channel interfaces 1208*a* and 120*b* while light is reflecting back through the ATR element 1204 as follows:

$$\beta > \sin^{-1}(n_2/n_1) \to 2\varphi < 180 + \theta - \sin^{-1}(n_2/n_1) \tag{Equation 4}$$

Moreover, the rear face angle ($\varphi$) is further configured to ensure refraction of the light on the input-output interface 1216 as follows:

$$\gamma < \sin^{-1}(n_{air}/n_1) \to 2\varphi > 180 - \sin^{-1}(n_1/n_{air}) \tag{Equation 5}$$

Thus, the output light 1214 can be deflected from the direction of the input light 1212 with an angle that depends on the rear face angle as follows:

$$\delta = \sin^{-1}(n_{crystal} \sin 2\varphi) \tag{Equation 6}$$

Figure 13:
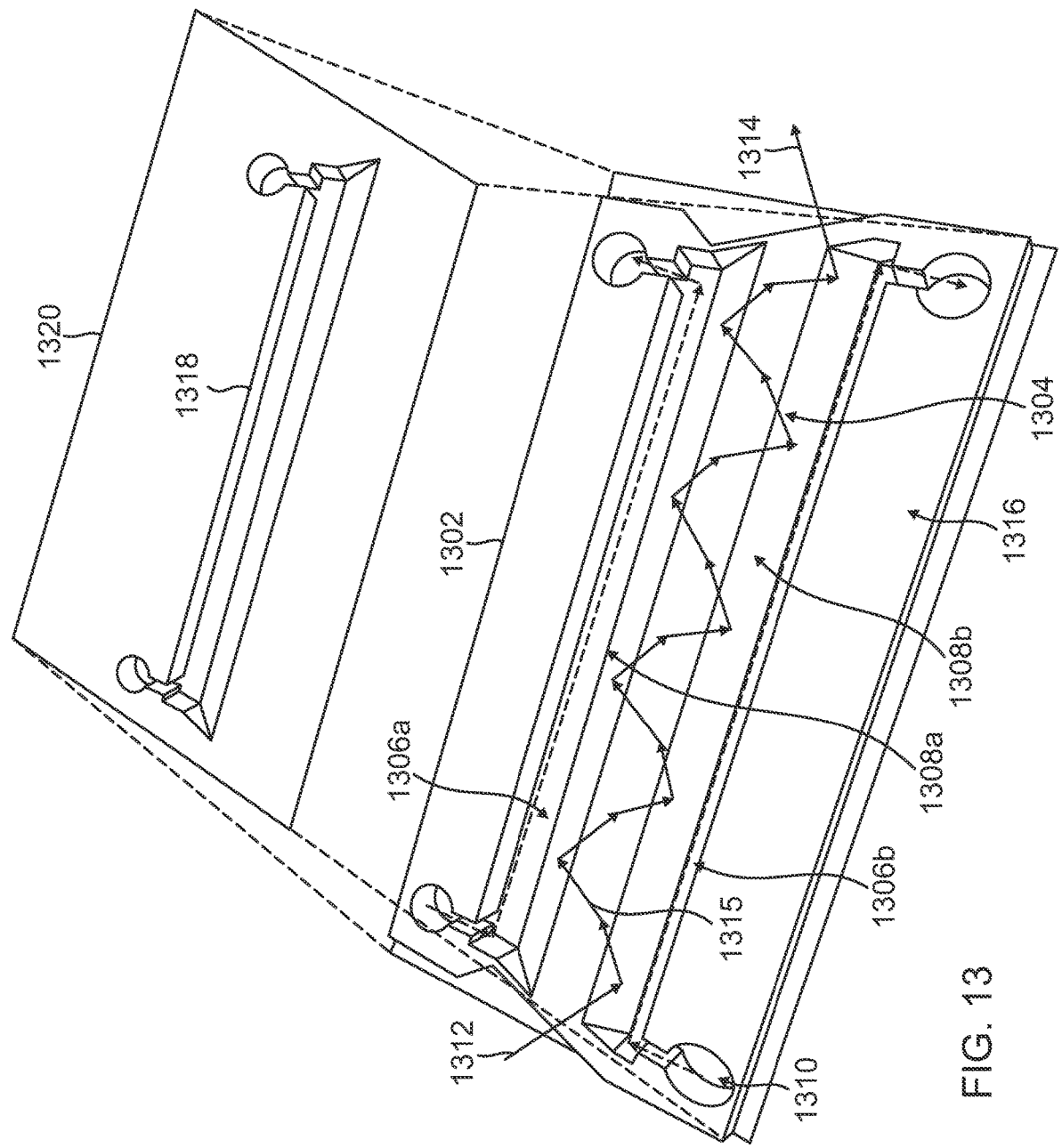
FIG. 13 is a diagram illustrating another example of an ATR element design according to some aspects.

FIG. 13 is a diagram illustrating another example of an ATR element design according to some aspects. The ATR element design shown in FIG. 13 is based on total internal reflection and interaction between light and the measured sample on four faces of the ATR element. In this ATR element design, the ATR element is fabricated using a geometry that has face angles on both side walls in addition to the input and output interfaces.

The ATR element design includes a substrate 1302 having an ATR element 1304 and microfluidic channels 1306*a* and 1306*b* formed therein (e.g., via a DRIE process). The substrate may be, for example, a silicon or SOI substrate. In some examples, the spectrometer may be formed on the same substrate 1302 as the ATR element 1304, as shown in FIGS. 7-9, or on a different, separate substrate, as shown in FIGS. 3-6.

The microfluidic channels 1306*a* and 1306*b* each include a sample (e.g., a fluid) that flows through the microfluidic channels 1306*a* and 1306*b* between respective input and output microfluidic ports 1310 thereof. The sample flows adjacent to a respective channel interface 1308*a* and 1308*b* between the corresponding microfluidic channels 1306*a* and 1306*b* and the ATR element 1304. For example, the channel interfaces 1308*a* and 1308*b* may each correspond to a Si-air/Si-sample interface. In the example shown in FIG. 13, the channel interfaces 1308a and 1308b are inclined sidewalls of the substrate 1302. For example, an additional etching step may be added to the DRIE process used in the MEMS spectrometer's fabrication procedure, such as anisotropic KOH etching, to create the inclined sidewalls.

The inclined sidewalls forming the channel interfaces 1308a and 1308b produce a light path 1315 having a helical shape in the ATR element 1304 in three dimensions instead of multiple reflections in a conventional single 2D plane. For example, the ATR element 1304 may be configured to receive input light 1312 at an incidence angle higher than the critical angle of one of the inclined sidewalls (e.g., channel interface 1308b) and to reflect the input light 1312 via total internal reflection through the ATR element 1304 in a helical manner such that the input light 1312 is reflected off both of the inclined sidewalls (e.g., channel interfaces 1308a and 1308b) and the top and bottom surfaces of the ATR element 1304 to produce output light 1314 attenuated by the evanescent wave formed in the sample.

In some examples, an additional microfluidic channel 1318 including the sample may be inserted above the substrate 1302 (e.g., on a top surface 1316 of the substrate 1302) to take advantage of added reflections. For example, a microfluidic PDMS device 1320 may be bonded on the top surface 1316 of substrate 1302. In this ATR element design, the input light 1312 propagates not only parallel to the substrate 1302, but also reflects back from the upper silicon interface with the PDMS device 1320.

Figure 14:
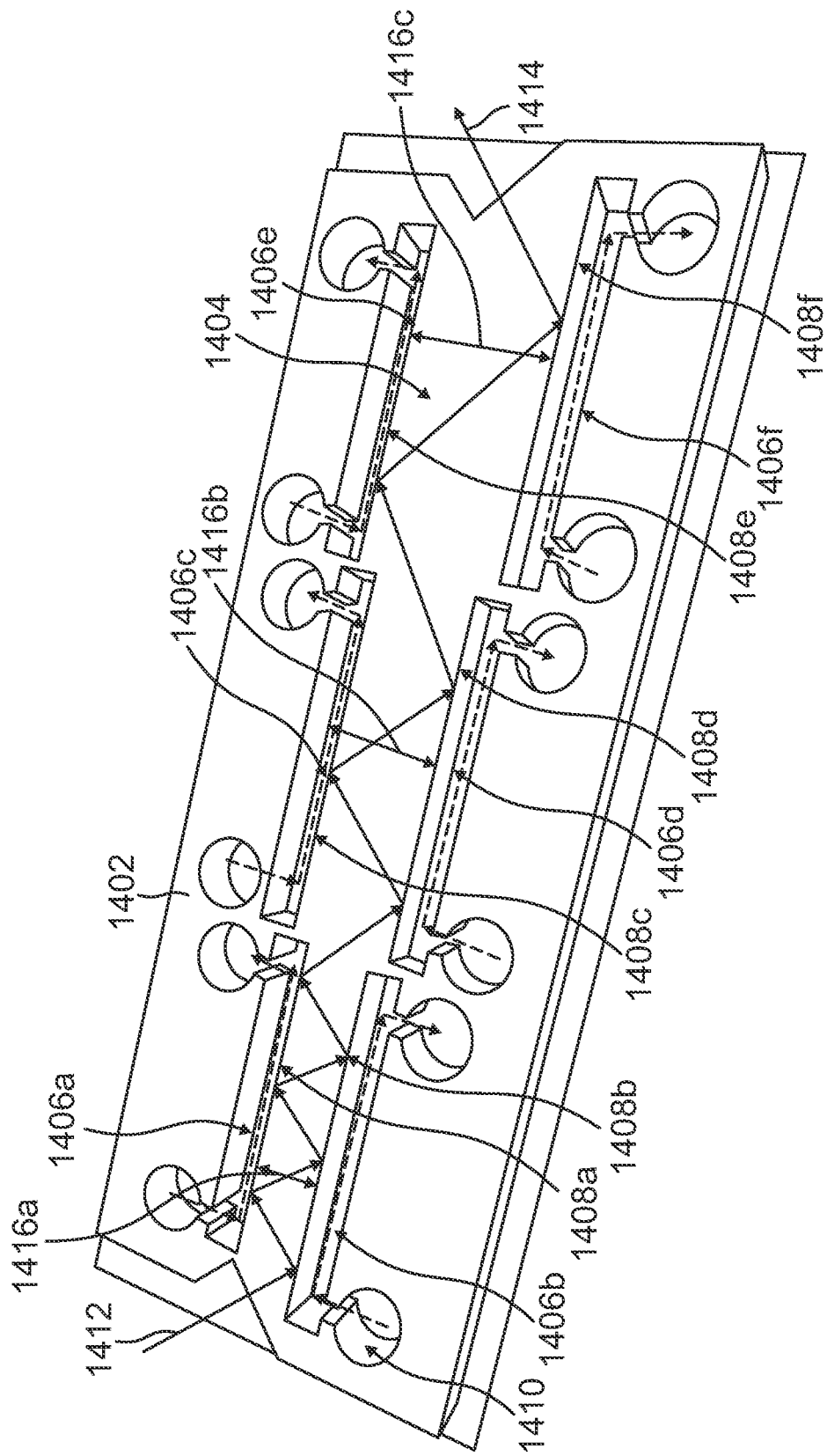
FIG. 14 is a diagram illustrating another example of an ATR element design according to some aspects.

FIG. 14 is a diagram illustrating another example of an ATR element design according to some aspects. The ATR element design shown in FIG. 14 provides a variable number of internal reflections to support different target applications. The ATR element design includes a substrate 1402 having an ATR element 1404 and a plurality of sets of opposing microfluidic channels (e.g., a first set of opposing microfluidic channels 1406a and 1406b, a second set of opposing microfluidic channels 1406c and 1406d, and a third set of opposing microfluidic channels 1406e and 1406f) formed therein (e.g., via a DRIE process). The substrate may be, for example, a silicon or SOI substrate. In some examples, the spectrometer may be formed on the same substrate 1402 as the ATR element 1404, as shown in FIGS. 7-9, or on a different, separate substrate, as shown in FIGS. 3-6.

One or more of the sets of microfluidic channels 1406a/1406b, 1406c/1406d, and/or 1406e/1406f may include a sample (e.g., a fluid) that flows through the microfluidic channels between respective input and output microfluidic ports 1410 thereof. The sample flows adjacent to respective channel interfaces 1408a/1408b, 1408c/1408d, and/or 1408e/1408f between the corresponding microfluidic channels 1406a/1406b, 1406c/1406d, and/or 1406e/1406f and the ATR element 1404. For example, the channel interfaces 1408a-1408f may each correspond to a Si-air/Si-sample interface.

Since the optimum ATR effective penetration depth depends directly on the target application and measured sample IR absorption level, the ATR element 1404 may be configured as a stepped waveguide having different respective widths 1416a, 1416b, and 1416c between the opposing microfluidic channels of each of the sets of opposing microfluidic channels 1406a/1406b, 1406c/1406d, and 1406e/1406f. The number of reflections is a function of the width 1416a, 1416b, and 1416c as follows:

$$N = \frac{L}{W\tan\theta} + 1, \quad \text{(Equation 7)}$$

where N is the number of internal reflections, θ is the incident angle, and L and W are the ATR element length and width. Wide ATR elements may be used for strongly absorbing materials, while narrow ATR elements may be used for weakly absorbing materials.

Thus, the ATR element stepped waveguide design shown in FIG. 14 may be used to measure different types of samples. For example, a strongly absorbing sample may be inserted into the microfluidic channels 1406a and 1406b that have a larger ATR width 1416a therebetween. Input light 1412 incident on the channel interface 1408b at an angle greater than the critical angle of the Si-sample channel interface 1408b is reflected via total internal reflection through the ATR element 1404 between channel interfaces 1408a and 1408b and between Si-air channel interfaces 1408c/1408d and 1408e/1408f to produce output light 1414. The output light 1414 is attenuated by an evanescent wave formed in the sample within microfluidic channels 1406a and 1406b based on the total internal reflected input light 1412. Samples having weaker absorption properties may similarly be measured using the second set of microfluidic channels 1406c/1406d or the third set of microfluidic channels 1406e/1406f.

Figure 15:
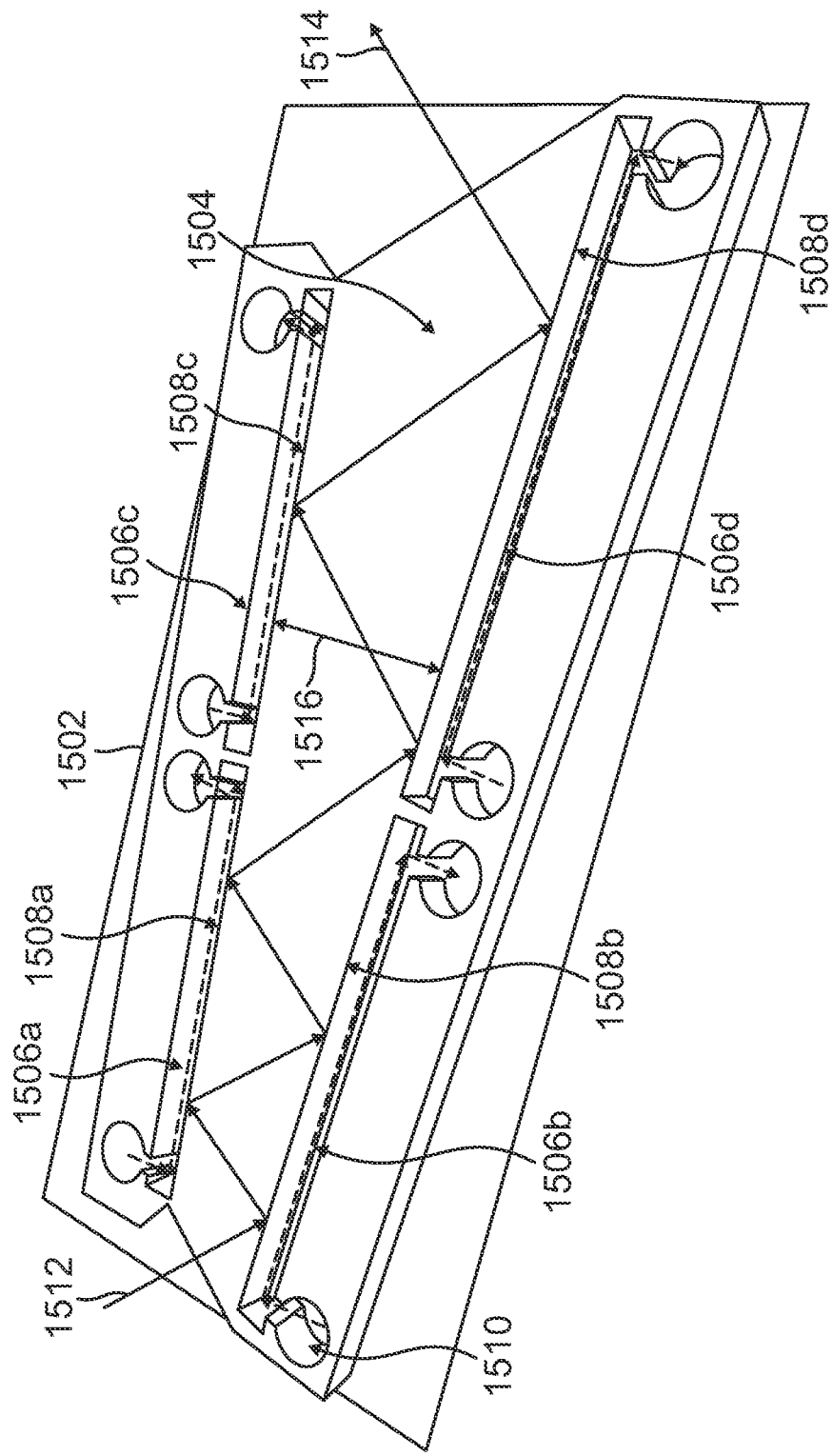
FIG. 15 is a diagram illustrating another example of an ATR element design according to some aspects.

FIG. 15 is a diagram illustrating another example of an ATR element design according to some aspects. The ATR element design shown in FIG. 15 also provides a variable number of internal reflections to support different target applications. The ATR element design includes a substrate 1502 having an ATR element 1504 and a plurality of sets of opposing microfluidic channels (e.g., a first set of opposing microfluidic channels 1506a and 1506b and a second set of opposing microfluidic channels 1506c and 1506d) formed therein (e.g., via a DRIE process). The substrate may be, for example, a silicon or SOI substrate. In some examples, the spectrometer may be formed on the same substrate 1502 as the ATR element 1404, as shown in FIGS. 7-9, or on a different, separate substrate, as shown in FIGS. 3-6.

One or more of the sets of microfluidic channels 1506a/1506b and/or 1506c/1506d may include a sample (e.g., a fluid) that flows through the microfluidic channels between respective input and output microfluidic ports 1510 thereof. The sample flows adjacent to respective channel interfaces 1508a/1508b and/or 1508c/1508d between the corresponding microfluidic channels 1506a/1506b and/or 1506c/1506d and the ATR element 1504. For example, the channel interfaces 1508a-1508d may each correspond to a Si-air/Si-sample interface.

The ATR element 1504 shown in FIG. 15 is configured as a tapered waveguide with a linearly varying ATR width 1516 between the microfluidic channels 1506a/1506b and 1506c/1506d. In this example, the incident angle may change through the ATR element 1504 due to tapering; however, the ATR element design can preserve the incident angle above the critical angle of the Si-air (or Si-sample) interface. As in the example shown in FIG. 14, wider ATR widths may be used for strongly absorbing samples, while narrower widths may be used for weakly absorbing samples. For example, a weakly absorbing sample may be inserted into the second set of microfluidic channels 1506c and 1506d. Input light 1512 incident on the channel interface 1508b at an angle greater than the critical angle of the Si-air channel interface 1508b is reflected via total internal reflection through the ATR element 1504 between the Si-air channel interfaces 1508a and 1508b and between the Si-sample channel interfaces 1508c and 1508d to produce output light 1514. The output light 1514 is attenuated by an evanescent wave formed in the sample within microfluidic channels 1506c and 1506d based on the total internal reflected input light 1512.

Figure 16:
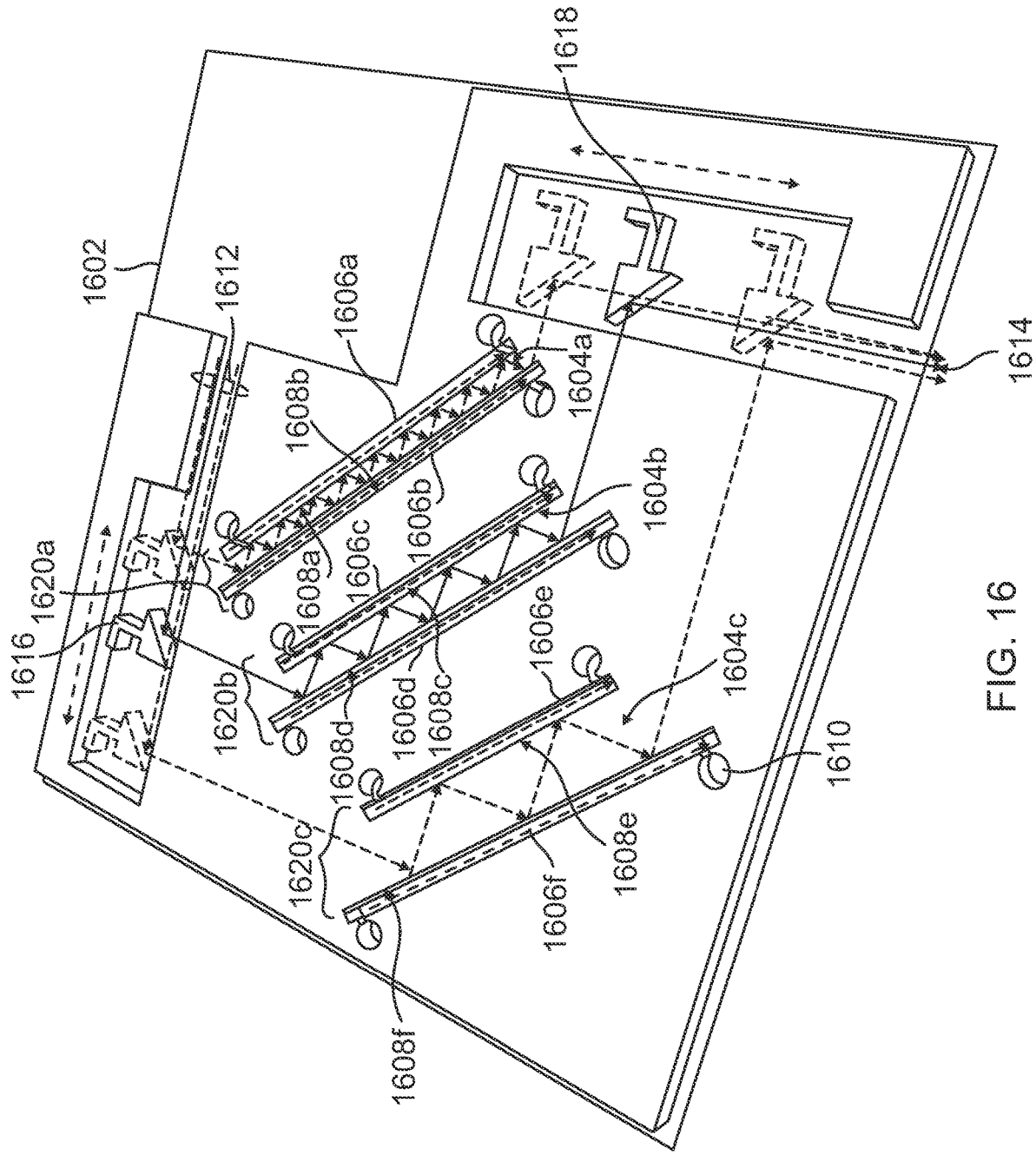
FIG. 16 is a diagram illustrating another example of an ATR element design according to some aspects.

FIG. 16 is a diagram illustrating another example of an ATR element design according to some aspects. The ATR element design shown in FIG. 16 also provides a variable number of internal reflections to support different target applications. The ATR element design includes a substrate 1602 having an ATR element including a plurality of waveguides 1604a, 1604b, and 1604c and a plurality of sets of opposing microfluidic channels (e.g., a first set of opposing microfluidic channels 1606a and 1606b, a second set of opposing microfluidic channels 1606c and 1606d, and a third set of opposing microfluidic channels 1606e and 1606f) formed therein (e.g., via a DRIE process). The substrate may be, for example, a silicon or SOI substrate. In some examples, the spectrometer may be formed on the same substrate 1602 as the ATR element 1604, as shown in FIGS. 7-9, or on a different, separate substrate, as shown in FIGS. 3-6.

One or more of the sets of microfluidic channels 1606a/1606b, 1606c/1606d, and/or 1606e/1606f may include a sample (e.g., a fluid) that flows through the microfluidic channels between respective input and output microfluidic ports 1610 thereof. The sample flows adjacent to respective channel interfaces 1608a/1608b, 1608c/1608d, and/or 1608e/1608f between the corresponding microfluidic channels 1606a/1606b, 1606c/1606d, and/or 1606e/1606f and the corresponding waveguide 1604a, 1604b, and/or 1604c. For example, the channel interfaces 1608a-1608f may each correspond to a Si-air/Si-sample interface.

Each of the ATR waveguides 1604a, 1604b, and 1604c may have different respective widths 1620a, 1620b, and 1620c configured to produce a different number of internal reflections. In addition, the ATR element design may further include moveable mirrors 1616 and 1618 formed in the substrate 1602 (e.g., via a DRIE process with a metallization step). Each moveable mirror (e.g., input mirror 1616 and output mirror 1618) may be coupled, for example, to a respective actuator (e.g., a MEMS actuator, such as an electrostatic comb drive actuator). In the example shown in FIG. 16, two different actuators may be used since the input and output mirrors 1616 and 1618 are translated in two perpendicular directions due to the 90-degree light deflection in the trapezoidal shaped ATR element design. If a parallelogram-shaped ATR element design is used, in which the light path may be translated without deflection, a single actuator may be used for both mirrors 1616 and 1618.

According to the position of the moveable mirrors 1616 and 1618, input light 1612 may be reflected by the input mirror 1616 towards a selected one of the ATR waveguides 1604a, 1604b, or 1604c with a desired number of reflections for the particular application (sample). The output light 1614 produced based on the number of total internal reflections within the selected waveguide 1604a, 1604b, or 1604c may then be received by the output mirror 1618 and reflected towards an output interface.

ATR analysis of micron-sized particles in liquids, such as microplastics in water, is typically challenged by the random distribution of particles across the liquid, which may be outside the vicinity of ATR effective penetration depth, accompanied by strong IR absorption in water. In various aspects of the disclosure, particle accumulation on the sidewalls of the ATR elements may be performed, by means of separating and sorting particles in microfluidic channels, to enter the evanescent field region of the guided modes outside the ATR crystal.

In some examples, Field Flow Fractionation (FFF) may be used for particle separation. In FFF, an external field of actuation is applied to force particles to move towards the sidewall in the direction of the applied field. Generally, the applied field could be electrically, thermally, gravitationally, or cross flow induced. Various other active separation mechanisms may also be used with the ATR design. For example, dielectrophoresis (DEP) can be used to electrically control translation of particles that are suspended in a fluid. In DEP, a suspended dielectric particle is exposed to a non-uniform electric field to polarize the particle, thereby causing the particle to move towards or away from regions of high electric field intensity. The strength and direction of the DEP force depends on the medium and the particle's electrical properties, the shape and size of the particle, and on the frequency and phase of the applied electric field.

Figure 17:
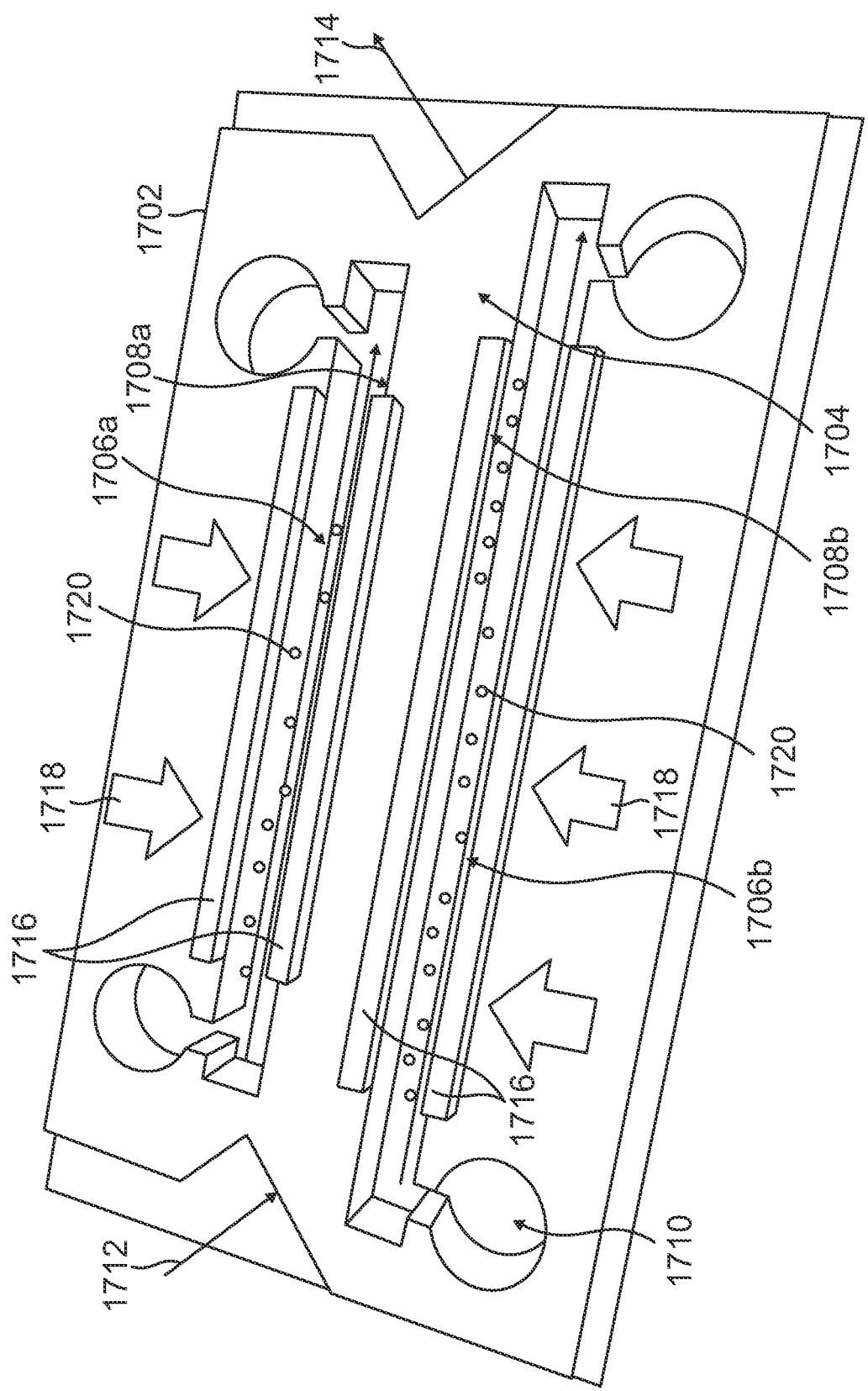
FIG. 17 is a diagram illustrating another example of an ATR element design based on Field Flow Fractionation (FFF) according to some aspects.

FIG. 17 is a diagram illustrating another example of an ATR element design based on FFF according to some aspects. The ATR element design includes a substrate 1702 having an ATR element 1704 (e.g., a waveguide) and microfluidic channels 1706a and 1706b formed therein (e.g., via a DRIE process). The substrate may be, for example, a silicon or SOI substrate. In some examples, the spectrometer may be formed on the same substrate 1702 as the ATR element 1704, as shown in FIGS. 7-9, or on a different, separate substrate, as shown in FIGS. 3-6.

The microfluidic channels 1706a and 1706b each include a sample (e.g., a fluid) that flows through the microfluidic channels 1706a and 1706b between respective input and output microfluidic ports 1710 thereof. The sample flows adjacent to a respective channel interface 1708a and 1708b between the corresponding microfluidic channels 1706a and 1706b and the ATR element 1704. For example, the channel interfaces 1708a and 1708b may each correspond to vertical sidewalls of the ATR element 1704 forming a Si-air/Si-sample interface.

In the FFF ATR element design shown in FIG. 17, an actuation field generator 1716 formed of electrodes may further be positioned on the top surface of the substrate 1702 adjacent to the microfluidic channels 1706a and 1706b to electrically induce an external actuation field 1718. The applied actuation field 1718 is configured to cause microparticles 1720 in the sample to move to the sidewalls (e.g., the channel interfaces 1708a and 1708b) of the ATR element 1704. The microparticles 1720 accumulated on the sidewalls interact with an evanescent wave produced based on total internal reflection of input light 1712 through the ATR element 1704 to produce output light 1714 attenuated by the evanescent wave.

Figure 18:
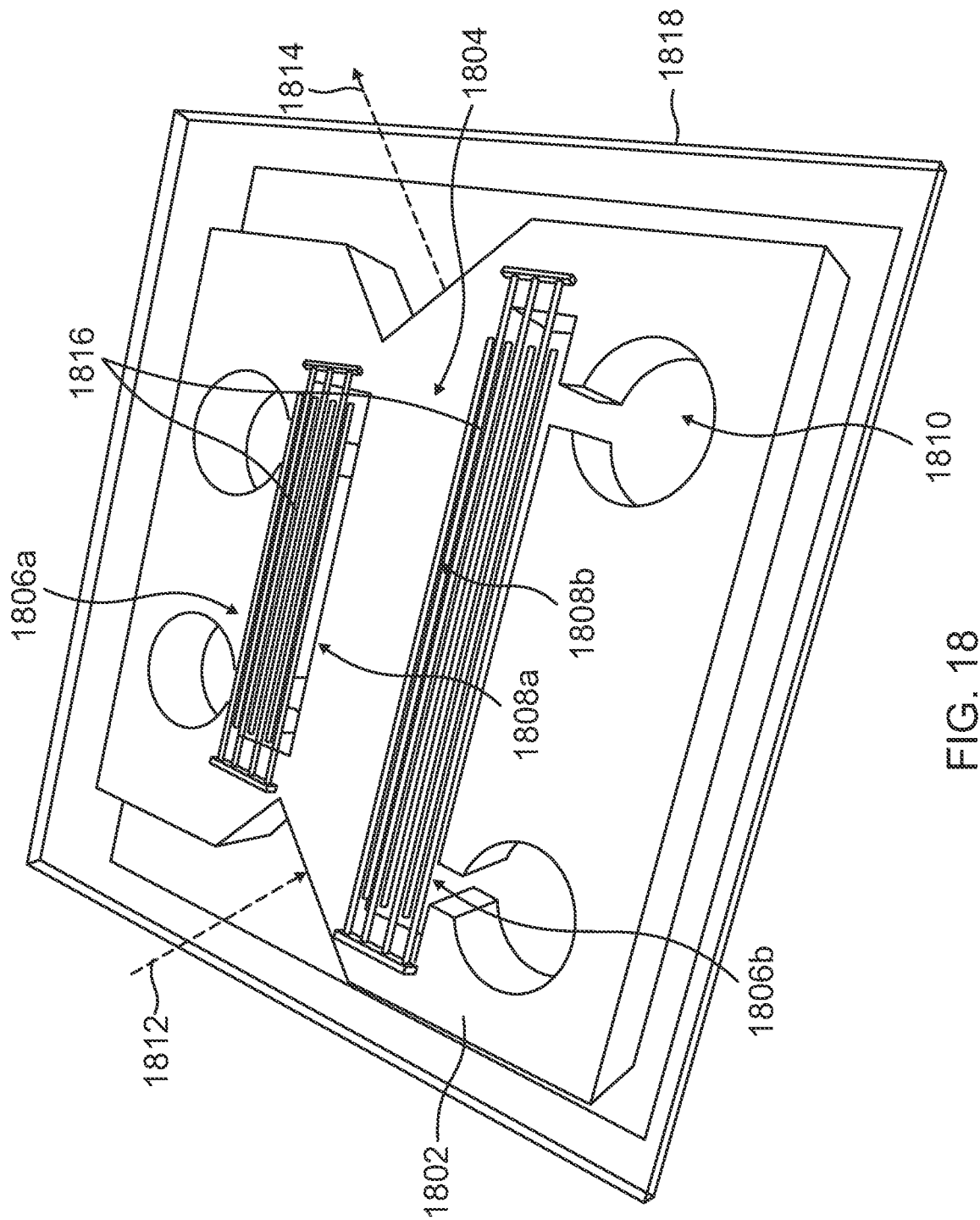
FIG. 18 is a diagram illustrating another example of an ATR element design based on dielectrophoresis (DEP) according to some aspects.

FIG. 18 is a diagram illustrating another example of an ATR element design based on DEP according to some aspects. The ATR element design includes a substrate 1802 having an ATR element 1804 (e.g., a waveguide) and microfluidic channels 1806a and 1806b formed therein (e.g., via a DRIE process). The substrate may be, for example, a silicon or SOI substrate. In some examples, the spectrometer may be formed on the same substrate 1802 as the ATR element 1804, as shown in FIGS. 7-9, or on a different, separate substrate, as shown in FIGS. 3-6.

The microfluidic channels 1806a and 1806b each include a sample (e.g., a fluid) that flows through the microfluidic channels 1806a and 1806b between respective input and output microfluidic ports 1810 thereof. The sample flows adjacent to a respective channel interface 1808a and 1808b between the corresponding microfluidic channels 1806a and 1806b and the ATR element 1804. For example, the channel interfaces 1808a and 1808b may each correspond to vertical sidewalls of the ATR element 1804 forming a Si-air/Si-sample interface.

In the DEP ATR element design shown in FIG. 18, an actuation field generator 1816 formed of an interdigitated electrode system may further be over the substrate 1802 to electrically induce a non-uniform electric field. The interdigitated electrode system 1816 produces a large value of an electric field gradient using modest values of applied voltage. In the example shown in FIG. 18, the interdigitated electrodes 1816 may be applied to a backside of a glass substrate 1818 using, for example, lithography techniques. The glass substrate 1818 may then be bonded to the top of silicon substrate 1802 that includes the ATR element 1804. The electrodes 1816 with applied AC voltage provide the DEP force to trap microparticles below the center of the electrodes 1816. The electrodes 1816 may be positioned with respect to the microfluidic channels 1806a and 1806b such that the microparticles in the sample are aggregated towards the sidewalls (e.g., channel interfaces 1808a and 1808b) in the vicinity of the light interaction region.

Thus, the applied actuation field is configured to cause microparticles in the sample to move to the sidewalls (e.g., the channel interfaces 1808a and 1808b) of the ATR element 1804. The microparticles accumulated on the sidewalls interact with an evanescent wave produced based on total internal reflection of input light 1812 through the ATR element 1804 to produce output light 1814 attenuated by the evanescent wave.

The following provides an overview of examples of the present disclosure.

Example 1: An integrated spectral sensing device, comprising: a first substrate comprising an attenuated total internal reflection (ATR) element, a microfluidic channel, and a channel interface corresponding to a boundary between the ATR element and the microfluidic channel formed therein, the ATR element configured to receive input light and to produce output light based on total internal reflection of the input light at the channel interface, the output light being attenuated by an evanescent wave produced by a sample contained within the microfluidic channel based on the total internal reflection of the input light; a spectrometer configured to produce an interference beam, the interference beam corresponding to the input light or being produced based on the output light; and a detector configured to detect a spectrum of the interference beam or the output light.

Example 2: The integrated sensing device of example 1, wherein the microfluidic channel comprises a first microfluidic channel having a first channel interface with the ATR element and a second microfluidic channel having a second channel interface with the ATR element, and wherein the total internal reflection of the input light occurs between the first channel interface and the second channel interface.

Example 3: The integrated sensing device of example 2, wherein the first substrate comprises a silicon substrate and each of the first channel interface and the second channel interface comprises a silicon-air interface.

Example 4: The integrated sensing device of example 2 or 3, wherein the ATR element comprises inclined sidewalls forming the first channel interface and the second channel interface, the inclined sidewalls producing a light path of the input light having a helical shape in three dimensions, and further comprising: an additional microfluidic channel positioned on a top surface of the first substrate above the ATR element in the light path of the input light.

Example 5: The integrated sensing device of example 2 or 3, wherein the ATR element comprises a waveguide pattern formed by the first channel interface and the second channel interface, the waveguide pattern comprising an array of parallel waveguides optically coupled at respective ends thereof.

Example 6: The integrated sensing device of example 2 or 3, wherein: the input light comprises a first input beam and a second input beam, the output light comprises a first output beam produced from the total internal reflection of the first input beam and a second output beam produced from the total internal reflection of the second input beam, the ATR element comprises a V-shaped input interface configured to receive the first input beam and direct the first input beam towards the first channel interface and to receive the second input beam and direct the second input beam towards the second channel interface, the ATR element comprises a V-shaped output interface configured to direct the first output beam to a first reflector and the second output beam to a second reflector, and the first reflector and the second reflector being configured to combine the first output beam and the second output beam to produce the output light.

Example 7: The integrated sensing device of example 2 or 3, wherein the ATR element comprises an input-output interface on a first side thereof and a rear interface on a second side thereof opposite the first side, the ATR element is configured to receive the input light via the input-output interface, totally internally reflect the input light from the rear interface, and output the output light via the input-output interface.

Example 8: The integrated sensing device of example 7, wherein: the input-output interface comprises a first face angle and the rear interface comprises a second face angle, the first face angle configured to produce the total internal reflection of the input light at the first channel interface, the input light being incident normal to the input-output interface, the second face angle configured to produce the total internal reflection of the input light at the rear interface and the second channel interface, the second face angle further configured to produce refraction of the output light at the input-output interface.

Example 9: The integrated sensing device of any of examples 1 through 8, further comprising: a second substrate parallel to the first substrate, the second substrate comprising the spectrometer; a first light redirecting element configured to receive the output light from the ATR element and to direct the output light into the spectrometer; and a second light redirecting element configured to reflect the interference beam to the detector.

Example 10: The integrated sensing device of example 9, wherein the ATR element comprises an angled surface configured to couple the output light in an out-of-plane direction with respect to a plane of the ATR element to the first light redirecting element.

Example 11: The integrated sensing device of example 9, further comprising: a third light redirecting element configured to receive the output light in a first plane of the ATR element and to reflect the output light in an out-of-plane direction with respect to the first plane towards the first light redirecting element, and wherein the first light redirecting element is configured to redirect the output light from the out-of-plane direction to an in-plane direction with respect to a second plane of the second substrate, the first plane and the second plane being parallel.

Example 12: The integrated sensing device of any of examples 1 through 8, further comprising: a second substrate comprising the spectrometer; a third substrate comprising a surface, wherein the first substrate, the second substrate, and the detector are positioned on the surface of the third substrate; and a light redirecting element positioned on the surface of the third substrate and configured to receive the input light in an out-of-plane direction with respect to a plane of the first substrate and the second substrate and to direct the input light towards the first substrate.

Example 13: The integrated sensing device of any of examples 1 through 8, wherein the first substrate further comprises the spectrometer and the spectrometer comprises a micro-electro-mechanical-systems (MEMS) interferometer etched in the first substrate.

Example 14: The integrated sensing device of example 13, wherein the MEMS interferometer is configured to receive an input beam, produce the interference beam corresponding to the input light from the input beam, and to direct the interference beam to the ATR element.

Example 15: The integrated sensing device of example 14, further comprising: a first guiding structure etched in the substrate configured to reflect the input light towards the channel interface at an incidence angle greater than or equal to a critical angle of the channel interface to produce the total internal reflection of the input light at the channel interface.

Example 16: The integrated sensing device of example 15, wherein the ATR element further comprises: a second guiding structure etched in the substrate and configured to facilitate multiple total internal reflections of the input light between the channel interface and the second light redirecting element.

Example 17: The integrated sensing device of example 16, wherein the first substrate comprises a silicon substrate and each of the first guiding structure and the second guiding structure comprises a respective silicon-air interface.

Example 18: The integrated sensing device of any of examples 13 through 17, wherein the MEMS interferometer is configured to receive the output light from the ATR element and to produce the interference beam based on the output light.

Example 19: The integrated spectral sensing device of any of examples 1 through 18, wherein the microfluidic channel comprises a plurality of sets of two opposing microfluidic channels, each of the plurality of sets of two opposing microfluidic channels being configured to produce a different respective number of reflections of the input light.

Example 20: The integrated spectral sensing device of example 19, wherein the ATR element further comprises a stepped waveguide comprising a different respective width between the two opposing microfluidic channels of each of the plurality of sets of two opposing microfluidic channels.

Example 21: The integrated spectral sensing device of example 19, wherein the ATR element further comprises a tapered waveguide between the plurality of sets of two opposing microfluidic channels.

Example 22: The integrated spectral sensing device of example 19, wherein the ATR element comprises a plurality of waveguides for the plurality of sets of two opposing microfluidic channels, each of the plurality of waveguides being between the two opposing microfluidic channels of a respective one of the plurality of sets of two opposing microfluidic channels, each of the plurality of waveguides having a different respective width, and further comprising: a first moveable mirror configured to reflect the input light to a selected waveguide of the plurality of waveguides and a second moveable mirror configured to receive the output light from the selected waveguide.

Example 23: The integrated spectral sensing device of any of examples 1 through 22, wherein the ATR element comprises sidewalls forming the channel interface and further comprising: an actuation field generator configured to apply an actuation field to the sample in the microfluidic channel, the actuation field configured to cause microparticles in the sample to move to the sidewalls of the ATR element to interact with the evanescent wave.

Example 24: The integrated spectral sensing device of example 23, wherein the actuation field comprises an electric field and the actuation field generator comprises an electrode on a top surface of the first substrate configured to produce the electric field.

Example 25: The integrated spectral sensing device of example 23, wherein the actuation field comprises a non-uniform electric field configured to apply a dielectrophoresis force to the microparticles, and the actuation field generator comprises interdigitated electrodes on a top surface of the first substrate.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another-even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-18 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1-18 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. An integrated spectral sensing device, comprising:
   a first substrate comprising an attenuated total internal reflection (ATR) element, a microfluidic channel, and a channel interface corresponding to a boundary between the ATR element and the microfluidic channel formed therein, the channel interface being formed at sidewalls of the ATR element, the ATR element configured to receive input light and to produce output light based on total internal reflection of the input light at the channel interface, the output light being attenuated by an evanescent wave produced by a sample contained within the microfluidic channel based on the total internal reflection of the input light;
   a spectrometer configured to produce an interference beam, the interference beam corresponding to the input light or being produced based on the output light; and
   a detector configured to detect a spectrum of the interference beam or the output light.

2. The integrated spectral sensing device of claim 1, wherein the microfluidic channel comprises a first microfluidic channel having a first channel interface with the ATR element and a second microfluidic channel having a second channel interface with the ATR element, and wherein the total internal reflection of the input light occurs between the first channel interface and the second channel interface.

3. The integrated spectral sensing device of claim 2, wherein the first substrate comprises a silicon substrate and each of the first channel interface and the second channel interface comprises a silicon-air interface.

4. The integrated spectral sensing device of claim 2, wherein the ATR element comprises inclined sidewalls forming the first channel interface and the second channel interface, the inclined sidewalls producing a light path of the input light having a helical shape in three dimensions, and further comprising:
   an additional microfluidic channel positioned on a top surface of the first substrate above the ATR element in the light path of the input light.

5. The integrated spectral sensing device of claim 2, wherein the ATR element comprises a waveguide pattern formed by the first channel interface and the second channel interface, the waveguide pattern comprising an array of parallel waveguides optically coupled at respective ends thereof.

6. The integrated spectral sensing device of claim 2, wherein:
   the input light comprises a first input beam and a second input beam,
   the output light comprises a first output beam produced from the total internal reflection of the first input beam and a second output beam produced from the total internal reflection of the second input beam,
   the ATR element comprises a V-shaped input interface configured to receive the first input beam and direct the first input beam towards the first channel interface and to receive the second input beam and direct the second input beam towards the second channel interface,
   the ATR element comprises a V-shaped output interface configured to direct the first output beam to a first reflector and the second output beam to a second reflector, and
   the first reflector and the second reflector being configured to combine the first output beam and the second output beam to produce the output light.

7. The integrated spectral sensing device of claim 2, wherein:
   the ATR element comprises an input-output interface on a first side thereof and a rear interface on a second side thereof opposite the first side,
   the ATR element is configured to receive the input light via the input-output interface, totally internally reflect the input light from the rear interface, and output the output light via the input-output interface.

8. The integrated spectral sensing device of claim 7, wherein:
   the input-output interface comprises a first face angle and the rear interface comprises a second face angle,
   the first face angle configured to produce the total internal reflection of the input light at the first channel interface, the input light being incident normal to the input-output interface,
   the second face angle configured to produce the total internal reflection of the input light at the rear interface and the second channel interface, the second face angle further configured to produce refraction of the output light at the input-output interface.

9. The integrated spectral sensing device of claim 1, further comprising:
   a second substrate parallel to the first substrate, the second substrate comprising the spectrometer;
   a first light redirecting element configured to receive the output light from the ATR element and to direct the output light into the spectrometer; and
   a second light redirecting element configured to reflect the interference beam to the detector.

10. The integrated spectral sensing device of claim 9, wherein the ATR element comprises an angled surface configured to couple the output light in an out-of-plane direction with respect to a plane of the ATR element to the first light redirecting element.

11. The integrated spectral sensing device of claim 9, further comprising:
   a third light redirecting element configured to receive the output light in a first plane of the ATR element and to reflect the output light in an out-of-plane direction with respect to the first plane towards the first light redirecting element, and wherein the first light redirecting element is configured to redirect the output light from the out-of-plane direction to an in-plane direction with respect to a second plane of the second substrate, the first plane and the second plane being parallel.

12. The integrated spectral sensing device of claim 1, further comprising:
   a second substrate comprising the spectrometer;
   a third substrate comprising a surface, wherein the first substrate, the second substrate, and the detector are positioned on the surface of the third substrate; and
   a light redirecting element positioned on the surface of the third substrate and configured to receive the input light in an out-of-plane direction with respect to a plane of the first substrate and the second substrate and to direct the input light towards the first substrate.

13. The integrated spectral sensing device of claim 1, wherein the first substrate further comprises the spectrometer and the spectrometer comprises a micro-electro-mechanical-systems (MEMS) interferometer etched in the first substrate.

14. The integrated spectral sensing device of claim 13, wherein the MEMS interferometer is configured to receive an input beam, produce the interference beam corresponding to the input light from the input beam, and to direct the interference beam to the ATR element.

15. The integrated spectral sensing device of claim 14, further comprising:
   a first guiding structure etched in the first substrate configured to reflect the input light towards the channel interface at an incidence angle greater than or equal to a critical angle of the channel interface to produce the total internal reflection of the input light at the channel interface.

16. The integrated spectral sensing device of claim 15, wherein the ATR element further comprises:
   a second guiding structure etched in the first substrate and configured to facilitate multiple total internal reflections of the input light between the channel interface and the second a light redirecting element.

17. The integrated spectral sensing device of claim 16, wherein the first substrate comprises a silicon substrate and each of the first guiding structure and the second guiding structure comprises a respective silicon-air interface.

18. The integrated spectral sensing device of claim 13, wherein the MEMS interferometer is configured to receive the output light from the ATR element and to produce the interference beam based on the output light.

19. The integrated spectral sensing device of claim 1, wherein the microfluidic channel comprises a plurality of sets of two opposing microfluidic channels, each of the plurality of sets of two opposing microfluidic channels being configured to produce a different respective number of reflections of the input light.

20. The integrated spectral sensing device of claim 19, wherein the ATR element further comprises a stepped waveguide comprising a different respective width between the two opposing microfluidic channels of each of the plurality of sets of two opposing microfluidic channels.

21. The integrated spectral sensing device of claim 19, wherein the ATR element further comprises a tapered waveguide between the plurality of sets of two opposing microfluidic channels.

22. The integrated spectral sensing device of claim 19, wherein the ATR element comprises a plurality of waveguides for the plurality of sets of two opposing microfluidic channels, each of the plurality of waveguides being between the two opposing microfluidic channels of a respective one of the plurality of sets of two opposing microfluidic channels, each of the plurality of waveguides having a different respective width, and further comprising:
   a first moveable mirror configured to reflect the input light to a selected waveguide of the plurality of waveguides and a second moveable minor configured to receive the output light from the selected waveguide.

23. The integrated spectral sensing device of claim 1, further comprising:
   an actuation field generator configured to apply an actuation field to the sample in the microfluidic channel, the actuation field configured to cause microparticles in the sample to move to the sidewalls of the ATR element to interact with the evanescent wave.

24. The integrated spectral sensing device of claim 23, wherein the actuation field comprises an electric field and the actuation field generator comprises an electrode on a top surface of the first substrate configured to produce the electric field.

25. The integrated spectral sensing device of claim 23, wherein the actuation field comprises a non-uniform electric field configured to apply a dielectrophoresis force to the microparticles, and the actuation field generator comprises interdigitated electrodes on a top surface of the first substrate.

* * * * *